(12) United States Patent
Desmarais

(10) Patent No.: US 12,345,604 B2
(45) Date of Patent: Jul. 1, 2025

(54) MONITORING OF TRACK SYSTEM FOR TRACTION OF A VEHICLE

(71) Applicant: CAMSO INC., Magog (CA)

(72) Inventor: Gerard Desmarais, Ghent (BE)

(73) Assignee: Camso Inc., Magog (CA)

( * ) Notice: Subject to any disclaimer, the term of this patent is extended or adjusted under 35 U.S.C. 154(b) by 289 days.

(21) Appl. No.: 17/914,651

(22) PCT Filed: Mar. 29, 2021

(86) PCT No.: PCT/CA2021/050404
§ 371 (c)(1),
(2) Date: Sep. 26, 2022

(87) PCT Pub. No.: WO2021/189154
PCT Pub. Date: Sep. 30, 2021

(65) Prior Publication Data
US 2023/0349793 A1 Nov. 2, 2023

Related U.S. Application Data

(60) Provisional application No. 63/000,823, filed on Mar. 27, 2020.

(51) Int. Cl.
*G01M 17/03* (2006.01)
*B62D 55/08* (2006.01)
(Continued)

(52) U.S. Cl.
CPC ............. *G01M 17/03* (2013.01); *B62D 55/08* (2013.01); *B62D 55/14* (2013.01); *B60K 35/00* (2013.01); *B60K 35/22* (2024.01); *B60K 35/28* (2024.01); *B60K 2360/167* (2024.01); *B62D 55/244* (2013.01)

(58) Field of Classification Search
CPC ........ B60K 35/00; B60K 35/22; B60K 35/28; B60K 2360/167; B62D 55/08; B62D 55/14; B62D 55/244; G01M 17/03
See application file for complete search history.

(56) References Cited

U.S. PATENT DOCUMENTS

| 6,386,653 B1 * | 5/2002 | Brandenburger | ...... B62D 55/30 180/9.1 |
| 2015/0321710 A1 * | 11/2015 | Zuchoski | ............. B62D 55/244 29/894 |

(Continued)

FOREIGN PATENT DOCUMENTS

CA 3085012 A1 * 12/2018 ........... A01B 79/005

*Primary Examiner* — Dale Moyer
(74) *Attorney, Agent, or Firm* — Hahn Loeser & Parks LLP

(57) ABSTRACT

A vehicle with a track system including a track for traction of the vehicle on a ground can be monitored (e.g., during operation of the vehicle) to obtain information regarding the vehicle, including information regarding the track system, such as a temperature and/or another characteristic of a wheel of the track system sensed by a sensor associated with that wheel, which can be used to inform a user (e.g., an operator of the vehicle) and/or control the vehicle (e.g., a speed of the vehicle), for properly aligning the track and/or other purposes. This may be useful, for example, to help prevent rapid wear or other deterioration of the track and/or for various other reasons.

20 Claims, 39 Drawing Sheets

(51) Int. Cl.
  *B62D 55/14*   (2006.01)
  *B60K 35/00*   (2006.01)
  *B60K 35/22*   (2024.01)
  *B60K 35/28*   (2024.01)
  *B62D 55/24*   (2006.01)

(56) References Cited

U.S. PATENT DOCUMENTS

| | | | |
|---|---|---|---|
| 2017/0087987 A1* | 3/2017 | Vik | B62D 55/065 |
| 2017/0174277 A1 | 6/2017 | Zuchoski et al. | |
| 2017/0177011 A1* | 6/2017 | Garvin | E02F 9/268 |
| 2018/0190045 A1* | 7/2018 | Richard | B62D 55/26 |
| 2018/0265145 A1* | 9/2018 | Todd | B60K 31/00 |
| 2018/0364744 A1* | 12/2018 | Garvin | B62D 55/08 |
| 2019/0233030 A1* | 8/2019 | Stefano | B62D 55/08 |

\* cited by examiner

MONITORING OF TRACK SYSTEM FOR TRACTION OF A VEHICLE

CROSS-REFERENCE TO RELATED APPLICATIONS

This application claims the benefit of U.S. Provisional Patent Application No. 63/000,823 filed Mar. 27, 2020, the entire content of which is incorporated by reference herein.

FIELD

This disclosure relates generally to off-road vehicles comprising track systems (e.g., agricultural vehicles, industrial vehicles, etc.) and, more particularly, to monitoring track systems for traction of vehicles.

BACKGROUND

Off-road vehicles, including agricultural vehicles (e.g., tractors, harvesters, combines, etc.), construction vehicles (e.g., loaders, excavators, bulldozers, etc.), and forestry vehicles (e.g., feller-bunchers, knuckleboom loaders, etc.), military vehicles (e.g., combat engineering vehicles (CEVs), etc.), snowmobiles, and all-terrain vehicles (ATVs), may comprise track systems to enhance their traction and floatation on soft, slippery, and/or irregular grounds (e.g., soil, mud, etc.).

In use, a track system, which comprises a track moving around a track-engaging assembly (e.g., including wheels), may experience various effects that can affect its performance, durability, etc. For example, the track may sometimes be poorly aligned with the track-engaging assembly, and this may lead to premature wear of the track, detracking, etc. In some cases, poor alignment of the track may generate heat which can be damageable. For instance, if too much heat is accumulated in it, the track may get damaged and eventually blowout.

Due to harsh environments and a moving nature of tracks and other components of track systems, it may be difficult to readily and reliably assess alignment or other aspects of their track during use.

For these and other reasons, improvements for track systems of vehicles would be welcomed.

SUMMARY

According to various aspects of this disclosure, a vehicle comprising a track system including a track for traction of the vehicle on a ground can be monitored (e.g., during operation of the vehicle) to obtain information regarding the vehicle, including information regarding the track system, such as a temperature and/or another characteristic of a wheel of the track system sensed by a sensor associated with that wheel, which can be used to inform a user (e.g., an operator of the vehicle) and/or control the vehicle (e.g., a speed of the vehicle), for properly aligning the track and/or other purposes. This may be useful, for example, to help prevent rapid wear or other deterioration of the track and/or for various other reasons.

For example, according to an aspect of this disclosure, there is provided a monitoring system for a vehicle comprising a track for traction of the vehicle on a ground. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The monitoring system comprises: a sensor configured to sense a characteristic of a given one of the wheels; and a processing apparatus configured to generate a signal relating to alignment of the track based on the characteristic of the given one of the wheels.

According to another aspect of this disclosure, there is provided a monitoring system for a vehicle comprising a track for traction of the vehicle on a ground. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The monitoring system comprises: a sensor configured to sense a characteristic of a given one of the wheels, the given one of the wheels comprising a rigid body comprising a hub portion, a rim portion, and a radially-extending portion between the hub portion and the rim portion, the sensor being mountable to the rigid body of the given one of the wheels; and a processing apparatus configured to generate a signal relating to alignment of the track based on the characteristic of the given one of the wheels.

According to another aspect of this disclosure, there is provided a monitoring system for a vehicle comprising a track for traction of the vehicle on a ground. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The wheels include a front idler wheel and a rear idler wheel spaced from one another in a longitudinal direction of the track system. The monitoring system comprises: a sensor configured to sense a characteristic of a given one of the front idler wheel and the rear idler wheel; and a processing apparatus configured to generate a signal relating to alignment of the track based on the characteristic of the given one of the front idler wheel and the rear idler wheel.

According to another aspect of this disclosure, there is provided a monitoring system for a vehicle comprising a track for traction of the vehicle on a ground. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The track comprises a plurality of wheel-contacting projections projecting from the inner surface of the track. The monitoring system comprises: a sensor configured to sense a characteristic of a given one of the wheels, the given one of the wheels comprising a projection-contacting region configured to contact respective ones of the wheel-contacting projections of the track, the sensor being located in the projection-contacting region of the given one of the wheels; and a processing apparatus configured to generate a signal relating to alignment of the track based on the characteristic of the given one of the wheels.

According to another aspect of this disclosure, there is provided a monitoring system for a vehicle comprising a track for traction of the vehicle on a ground. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The track comprises a plurality of wheel-contacting projections projecting from the inner surface of the track. The monitoring system comprises: a sensor configured to sense a characteristic of a given one of the wheels, the sensor being located on the given one of the wheels within a distance from a periphery of the given one of the wheels that is no more than a height of an individual one of the wheel-contacting projections of the track; and a processing apparatus configured to generate a signal relating to alignment of the track based on the characteristic of the given one of the wheels.

According to another aspect of this disclosure, there is provided a monitoring system for a vehicle comprising a track for traction of the vehicle on a ground. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The monitoring system comprises: a first sensor configured to sense a characteristic of a first one of the wheels; a second sensor configured to sense a characteristic of a second one of the wheels; and a processing apparatus configured to generate a signal relating to alignment of the track based on the characteristic of the first one of the wheels and the characteristic of the second one of the wheels.

According to another aspect of this disclosure, there is provided a track system for traction of a vehicle. The track system comprises: a track comprising a ground-engaging outer surface and an inner surface opposite to the ground-engaging outer surface; a track-engaging assembly configured to move the track around the track-engaging assembly, the track being elastomeric to flex around the track-engaging assembly, the track-engaging assembly comprising a plurality of wheels for engaging the track; and a sensor configured to sense a characteristic of a given one of the wheels, the sensor being configured to interact with a processing apparatus configured to generate a signal relating to alignment of the track based on the characteristic of the given one of the wheels.

According to another aspect of this disclosure, there is provided a track system for traction of a vehicle. The track system comprises: a track comprising a ground-engaging outer surface and an inner surface opposite to the ground-engaging outer surface; a track-engaging assembly configured to move the track around the track-engaging assembly, the track being elastomeric to flex around the track-engaging assembly, the track-engaging assembly comprising a plurality of wheels for engaging the track; and a sensor configured to sense a characteristic of a given one of the wheels, the given one of the wheels comprising a rigid body comprising a hub portion, a rim portion, and a radially-extending portion between the hub portion and the rim portion, the sensor being mounted to the rigid body of the given one of the wheels.

According to another aspect of this disclosure, there is provided a track system for traction of a vehicle. The track system comprises: a track comprising a ground-engaging outer surface and an inner surface opposite to the ground-engaging outer surface; a track-engaging assembly configured to move the track around the track-engaging assembly, the track being elastomeric to flex around the track-engaging assembly, the track-engaging assembly comprising a plurality of wheels for engaging the track, the wheels including a front idler wheel and a rear idler wheel spaced from one another in a longitudinal direction of the track system; and a sensor mounted to a given one of the front idler wheel and the rear idler wheel and configured to sense a characteristic of the given one of the front idler wheel and the rear idler wheel.

According to another aspect of this disclosure, there is provided a track system for traction of a vehicle. The track system comprises: a track comprising a ground-engaging outer surface, an inner surface opposite to the ground-engaging outer surface, and a plurality of wheel-contacting projections projecting from the inner surface of the track; a track-engaging assembly configured to move the track around the track-engaging assembly, the track being elastomeric to flex around the track-engaging assembly, the track-engaging assembly comprising a plurality of wheels for engaging the track; and a sensor configured to sense a characteristic of a given one of the wheels, the given one of the wheels comprising a projection-contacting region configured to contact respective ones of the wheel-contacting projections of the track, the sensor being located in the projection-contacting region of the given one of the wheels.

According to another aspect of this disclosure, there is provided a track system for traction of a vehicle. The track system comprises: a track comprising a ground-engaging outer surface, an inner surface opposite to the ground-engaging outer surface, and a plurality of wheel-contacting projections projecting from the inner surface of the track; a track-engaging assembly configured to move the track around the track-engaging assembly, the track being elastomeric to flex around the track-engaging assembly, the track-engaging assembly comprising a plurality of wheels for engaging the track; and a sensor configured to sense a characteristic of a given one of the wheels, the sensor being located on the given one of the wheels within a distance from a periphery of the given one of the wheels that is no more than a height of an individual one of the wheel-contacting projections of the track.

According to another aspect of this disclosure, there is provided a track system for traction of a vehicle. The track system comprises: a track comprising a ground-engaging outer surface and an inner surface opposite to the ground-engaging outer surface; a track-engaging assembly configured to move the track around the track-engaging assembly, the track being elastomeric to flex around the track-engaging assembly, the track-engaging assembly comprising a plurality of wheels for engaging the track; a first sensor configured to sense a characteristic of a first one of the wheels and a second sensor configured to sense a characteristic of a second one of the wheels, the first sensor and the second sensor being configured to interact with a processing apparatus configured to generate a signal relating to alignment of the track based on the characteristic of the first one of the wheels and the characteristic of the second one of the wheels.

According to another aspect of this disclosure, there is provided a wheel for a track system for traction of a vehicle. The track system comprises a track that comprises a ground-engaging outer surface and an inner surface opposite to the ground-engaging outer surface. The track system comprises a track-engaging assembly configured to move the track around the track-engaging assembly. The track is elastomeric to flex around the track-engaging assembly. The wheel is configured to be one of a plurality of wheels of the track-engaging assembly. The wheel comprises: a rigid body comprising a hub portion, a rim portion, and a radially-extending portion between the hub portion and the rim portion; and a sensor configured to sense a characteristic of the wheel, the sensor being configured to interact with a processing apparatus configured to generate a signal relating to alignment of the track based on the characteristic of the wheel.

According to another aspect of this disclosure, there is provided a wheel for a track system for traction of a vehicle. The track system comprises a track that comprises a ground-engaging outer surface and an inner surface opposite to the ground-engaging outer surface. The track system comprises a track-engaging assembly configured to move the track around the track-engaging assembly. The track is elastomeric to flex around the track-engaging assembly. The wheel is configured to be one of a plurality of wheels of the track-engaging assembly. The wheel comprises: a rigid body comprising a hub portion, a rim portion, and a radially-extending portion between the hub portion and the rim portion; and a sensor mounted to the rigid body and configured to sense a characteristic of the wheel.

According to another aspect of this disclosure, there is provided a wheel for a track system for traction of a vehicle. The track system comprises a track that comprises a ground-engaging outer surface, an inner surface opposite to the ground-engaging outer surface, and a plurality of wheel-contacting projections projecting from the inner surface of the track. The track system comprises a track-engaging assembly configured to move the track around the track-engaging assembly. The track is elastomeric to flex around the track-engaging assembly. The wheel is configured to be one of a plurality of wheels of the track-engaging assembly. The wheel comprises: a rigid body comprising a hub portion, a rim portion, and a radially-extending portion between the hub portion and the rim portion; and a sensor configured to sense a characteristic of the wheel, the wheel comprising a projection-contacting region configured to contact respective ones of the wheel-contacting projections of the track, the sensor being located in the projection-contacting region of the wheel.

According to another aspect of this disclosure, there is provided a wheel for a track system for traction of a vehicle. The track system comprises a track that comprises a ground-engaging outer surface, an inner surface opposite to the ground-engaging outer surface, and a plurality of wheel-contacting projections projecting from the inner surface of the track. The track system comprises a track-engaging assembly configured to move the track around the track-engaging assembly. The track is elastomeric to flex around the track-engaging assembly. The wheel is configured to be one of a plurality of wheels of the track-engaging assembly. The wheel comprises: a rigid body comprising a hub portion, a rim portion, and a radially-extending portion between the hub portion and the rim portion; and a sensor configured to sense a characteristic of the wheel, the sensor being located on the wheel within a distance from a periphery of the wheel that is no more than a height of an individual one of the wheel-contacting projections of the track.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The method comprises: using a sensor to sense a characteristic of a given one of the wheels; and generating a signal relating to alignment of the track based on the characteristic of the given one of the wheels.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly com comprises prising a plurality of wheels for engaging the track. The track is elastomeric to flex around the track-engaging assembly. The method co comprises comprises: using a sensor to sense a characteristic of a given one of the wheels, the given one of the wheels comprising a rigid body comprising a hub portion, a rim portion, and a radially-extending portion between the hub portion and the rim portion, the sensor being mounted to the rigid body of the given one of the wheels; and generating a signal relating to alignment of the track based on the characteristic of the given one of the wheels.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The wheels include a front idler wheel and a rear idler wheel spaced from one another in a longitudinal direction of the track system. The method comprises: using a sensor to sense a characteristic of a given one of the front idler wheel and the rear idler wheel; and generating a signal relating to alignment of the track based on the characteristic of the given one of the front idler wheel and the rear idler wheel.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The track comprises a plurality of wheel-contacting projections projecting from the inner surface of the track. The method comprises: using a sensor to sense a characteristic of a given one of the wheels, the given one of the wheels comprising a projection-contacting region configured to contact respective ones of the wheel-contacting projections of the track, the sensor being located in the projection-contacting region of the given one of the wheels; and generating a signal relating to alignment of the track based on the characteristic of the given one of the wheels.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The track comprises a plurality of wheel-contacting projections projecting from the inner surface of the track. The method comprises: using a sensor to sense a characteristic of a given one of the wheels, the sensor being located on the given one of the wheels within a distance from a periphery of the given one of the wheels that is no more than a height of an individual one of the wheel-contacting projections of the track; and generating a signal relating to alignment of the track based on the characteristic of the given one of the wheels.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The method comprises: using a first sensor to sense a characteristic of a first one of the wheels; using a second sensor to sense a characteristic of a second one of the wheels; and generating a signal relating to alignment of the track based on the characteristic of the first one of the wheels and the characteristic of the second one of the wheels.

According to another aspect of this disclosure, there is provided a monitoring system for a vehicle comprising a track for traction of the vehicle on a ground. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The monitoring system comprises: a temperature sensor configured to sense a temperature of a given one of the wheels; and a processing apparatus configured to generate a signal relating to alignment of the track based on the temperature of the given one of the wheels.

According to another aspect of this disclosure, there is provided a monitoring system for a vehicle comprising a track for traction of the vehicle on a ground. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The monitoring system comprises: a temperature sensor configured to sense a temperature of a given one of the wheels, the given one of the wheels comprising a rigid body comprising a hub portion, a rim portion, and a radially-extending portion between the hub portion and the rim portion, the temperature sensor being mountable to the rigid body of the given one of the wheels; and a processing apparatus configured to generate a signal relating to alignment of the track based on the temperature of the given one of the wheels.

According to another aspect of this disclosure, there is provided a monitoring system for a vehicle comprising a track for traction of the vehicle on a ground. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The wheels include a front idler wheel and a rear idler wheel spaced from one another in a longitudinal direction of the track system. The monitoring system comprises: a temperature sensor configured to sense a temperature of a given one of the front idler wheel and the rear idler wheel; and a processing apparatus configured to generate a signal relating to alignment of the track based on the temperature of the given one of the front idler wheel and the rear idler wheel.

According to another aspect of this disclosure, there is provided a monitoring system for a vehicle comprising a track for traction of the vehicle on a ground. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The track comprises a plurality of wheel-contacting projections projecting from the inner surface of the track. The monitoring system comprises: a temperature sensor configured to sense a temperature of a given one of the wheels, the given one of the wheels comprising a projection-contacting region configured to contact respective ones of the wheel-contacting projections of the track, the temperature sensor being located in the projection-contacting region of the given one of the wheels; and a processing apparatus configured to generate a signal relating to alignment of the track based on the temperature of the given one of the wheels.

According to another aspect of this disclosure, there is provided a monitoring system for a vehicle comprising a track for traction of the vehicle on a ground. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The track comprises a plurality of wheel-contacting projections projecting from the inner surface of the track. The monitoring system comprises: a temperature sensor configured to sense a temperature of a given one of the wheels, the temperature sensor being located on the given one of the wheels within a distance from a periphery of the given one of the wheels that is no more than a height of an individual one of the wheel-contacting projections of the track; and a processing apparatus configured to generate a signal relating to alignment of the track based on the temperature of the given one of the wheels.

According to another aspect of this disclosure, there is provided a monitoring system for a vehicle comprising a track for traction of the vehicle on a ground. The track comprising a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The monitoring system comprises: a first temperature sensor configured to sense a temperature of a first one of the wheels; a second temperature sensor configured to sense a temperature of a second one of the wheels; and a processing apparatus configured to generate a signal relating to alignment of the track based on the temperature of the first one of the wheels and the temperature of the second one of the wheels.

According to another aspect of this disclosure, there is provided a track system for traction of a vehicle. The track system comprises: a track comprising a ground-engaging outer surface and an inner surface opposite to the ground-engaging outer surface; a track-engaging assembly configured to move the track around the track-engaging assembly, the track being elastomeric to flex around the track-engaging assembly, the track-engaging assembly comprising a plurality of wheels for engaging the track; and a temperature sensor configured to sense a temperature of a given one of the wheels, the temperature sensor being configured to interact with a processing apparatus configured to generate a signal relating to alignment of the track based on the temperature of the given one of the wheels.

According to another aspect of this disclosure, there is provided a track system for traction of a vehicle. The track system comprises: a track comprising a ground-engaging outer surface and an inner surface opposite to the ground-engaging outer surface; a track-engaging assembly configured to move the track around the track-engaging assembly, the track being elastomeric to flex around the track-engaging assembly, the track-engaging assembly comprising a plurality of wheels for engaging the track; and a temperature sensor configured to sense a temperature of a given one of the wheels, the given one of the wheels comprising a rigid body comprising a hub portion, a rim portion, and a radially-extending portion between the hub portion and the rim portion, the temperature sensor being mounted to the rigid body of the given one of the wheels.

According to another aspect of this disclosure, there is provided a track system for traction of a vehicle. The track system comprises: a track comprising a ground-engaging outer surface and an inner surface opposite to the ground-engaging outer surface; a track-engaging assembly configured to move the track around the track-engaging assembly, the track being elastomeric to flex around the track-engaging assembly, the track-engaging assembly comprising a plurality of wheels for engaging the track, the wheels including a front idler wheel and a rear idler wheel spaced from one another in a longitudinal direction of the track system; and a temperature sensor mounted to a given one of the front idler wheel and the rear idler wheel and configured to sense a temperature of the given one of the front idler wheel and the rear idler wheel.

According to another aspect of this disclosure, there is provided a track system for traction of a vehicle. The track system comprises: a track comprising a ground-engaging outer surface, an inner surface opposite to the ground-engaging outer surface, and a plurality of wheel-contacting projections projecting from the inner surface of the track; a track-engaging assembly configured to move the track around the track-engaging assembly, the track being elastomeric to flex around the track-engaging assembly, the track-engaging assembly comprising a plurality of wheels for engaging the track; and a temperature sensor configured to sense a temperature of a given one of the wheels, the given one of the wheels comprising a projection-contacting region configured to contact respective ones of the wheel-contacting projections of the track, the temperature sensor being located in the projection-contacting region of the given one of the wheels.

According to another aspect of this disclosure, there is provided a track system for traction of a vehicle. The track system comprises: a track comprising a ground-engaging outer surface, an inner surface opposite to the ground-engaging outer surface, and a plurality of wheel-contacting projections projecting from the inner surface of the track; a track-engaging assembly configured to move the track around the track-engaging assembly, the track being elastomeric to flex around the track-engaging assembly, the track-engaging assembly comprising a plurality of wheels for engaging the track; and a temperature sensor configured to sense a temperature of a given one of the wheels, the temperature sensor being located on the given one of the wheels within a distance from a periphery of the given one of the wheels that is no more than a height of an individual one of the wheel-contacting projections of the track.

According to another aspect of this disclosure, there is provided a track system for traction of a vehicle. The track system comprises: a track comprising a ground-engaging outer surface and an inner surface opposite to the ground-engaging outer surface; a track-engaging assembly configured to move the track around the track-engaging assembly, the track being elastomeric to flex around the track-engaging assembly, the track-engaging assembly comprising a plurality of wheels for engaging the track; a first temperature sensor configured to sense a temperature of a first one of the wheels and a second temperature sensor configured to sense a temperature of a second one of the wheels, the first temperature sensor and the second temperature sensor being configured to interact with a processing apparatus configured to generate a signal relating to alignment of the track based on the temperature of the first one of the wheels and the temperature of the second one of the wheels.

According to another aspect of this disclosure, there is provided a wheel for a track system for traction of a vehicle. The track system comprises a track that comprises a ground-engaging outer surface and an inner surface opposite to the ground-engaging outer surface. The track system comprises a track-engaging assembly configured to move the track around the track-engaging assembly, the track being elastomeric to flex around the track-engaging assembly. The wheel is configured to be one of a plurality of wheels of the track-engaging assembly. The wheel comprises: a rigid body comprising a hub portion, a rim portion, and a radially-extending portion between the hub portion and the rim portion; and a temperature sensor configured to sense a temperature of the wheel, the temperature sensor being configured to interact with a processing apparatus configured to generate a signal relating to alignment of the track based on the temperature of the wheel.

According to another aspect of this disclosure, there is provided a wheel for a track system for traction of a vehicle. The track system comprises a track that comprises a ground-engaging outer surface and an inner surface opposite to the ground-engaging outer surface. The track system comprises a track-engaging assembly configured to move the track around the track-engaging assembly. The track is elastomeric to flex around the track-engaging assembly. The wheel is configured to be one of a plurality of wheels of the track-engaging assembly. The wheel comprises: a rigid body comprising a hub portion, a rim portion, and a radially-extending portion between the hub portion and the rim portion; and a temperature sensor mounted to the rigid body and configured to sense a temperature of the wheel.

According to another aspect of this disclosure, there is provided a wheel for a track system for traction of a vehicle. The track system comprises a track that comprises a ground-engaging outer surface, an inner surface opposite to the ground-engaging outer surface, and a plurality of wheel-contacting projections projecting from the inner surface of the track. The track system comprises a track-engaging assembly configured to move the track around the track-engaging assembly. The track is elastomeric to flex around the track-engaging assembly. The wheel is configured to be one of a plurality of wheels of the track-engaging assembly. The wheel comprises: a rigid body comprising a hub portion, a rim portion, and a radially-extending portion between the hub portion and the rim portion; and a temperature sensor configured to sense a temperature of the wheel, the wheel comprising a projection-contacting region configured to contact respective ones of the wheel-contacting projections of the track, the temperature sensor being located in the projection-contacting region of the wheel.

According to another aspect of this disclosure, there is provided a wheel for a track system for traction of a vehicle. The track system comprises a track that comprises a ground-engaging outer surface, an inner surface opposite to the ground-engaging outer surface, and a plurality of wheel-contacting projections projecting from the inner surface of the track. The track system comprises a track-engaging assembly configured to move the track around the track-engaging assembly. The track is elastomeric to flex around the track-engaging assembly. The wheel is configured to be one of a plurality of wheels of the track-engaging assembly. The wheel comprises: a rigid body comprising a hub portion, a rim portion, and a radially-extending portion between the hub portion and the rim portion; and a temperature sensor configured to sense a temperature of the wheel, the temperature sensor being located on the wheel within a distance from a periphery of the wheel that is no more than a height of an individual one of the wheel-contacting projections of the track.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The method comprises: using a temperature sensor to sense a temperature of a given one of the wheels; and generating a signal relating to alignment of the track based on the temperature of the given one of the wheels.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The method comprises: using a temperature sensor to sense a temperature of a given one of the wheels, the given one of the wheels comprising a rigid body comprising a hub portion, a rim portion, and a radially-extending portion between the hub portion and the rim portion, the temperature sensor being mounted to the rigid body of the given one of the wheels; and generating a signal relating to alignment of the track based on the temperature of the given one of the wheels.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The wheels include a front idler wheel and a rear idler wheel spaced from one another in a longitudinal direction of the track system. The method comprises: using a temperature sensor to sense a temperature of a given one of the front idler wheel and the rear idler wheel; and generating a signal relating to alignment of the track based on the temperature of the given one of the front idler wheel and the rear idler wheel.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The track comprises a plurality of wheel-contacting projections projecting from the inner surface of the track. The method comprises: using a temperature sensor to sense a temperature of a given one of the wheels, the given one of the wheels comprising a projection-contacting region configured to contact respective ones of the wheel-contacting projections of the track, the temperature sensor being located in the projection-contacting region of the given one of the wheels; and generating a signal relating to alignment of the track based on the temperature of the given one of the wheels.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly. The track comprises a plurality of wheel-contacting projections projecting from the inner surface of the track. The method comprises: using a temperature sensor to sense a temperature of a given one of the wheels, the temperature sensor being located on the given one of the wheels within a distance from a periphery of the given one of the wheels that is no more than a height of an individual one of the wheel-contacting projections of the track; and generating a signal relating to alignment of the track based on the temperature of the given one of the wheels.

According to another aspect of this disclosure, there is provided a method for monitoring a vehicle comprising a track. The track comprises a ground-engaging outer surface and an inner surface opposite to the ground-engaging outer surface and is mounted around a track-engaging assembly configured to move the track around the track-engaging assembly. The track-engaging assembly comprises a plurality of wheels for engaging the track. The track is elastomeric to flex around the track-engaging assembly, the method comprises: using a first temperature sensor to sense a temperature of a first one of the wheels; using a second temperature sensor to sense a temperature of a second one of the wheels; and generating a signal relating to alignment of the track based on the temperature of the first one of the wheels and the temperature of the second one of the wheels.

These and other aspects of this disclosure will now become apparent to those of ordinary skill in the art upon review of a description of embodiments that follows in conjunction with accompanying drawings.

BRIEF DESCRIPTION OF DRAWINGS

A detailed description of embodiments is provided below, by way of example only, with reference to the accompanying drawings, in which.

It is to be expressly understood that the description and drawings are only for purposes of illustrating certain embodiments and are an aid for understanding. They are not intended to be and should not be limiting.

DETAILED DESCRIPTION OF EMBODIMENTS

Figure 1:
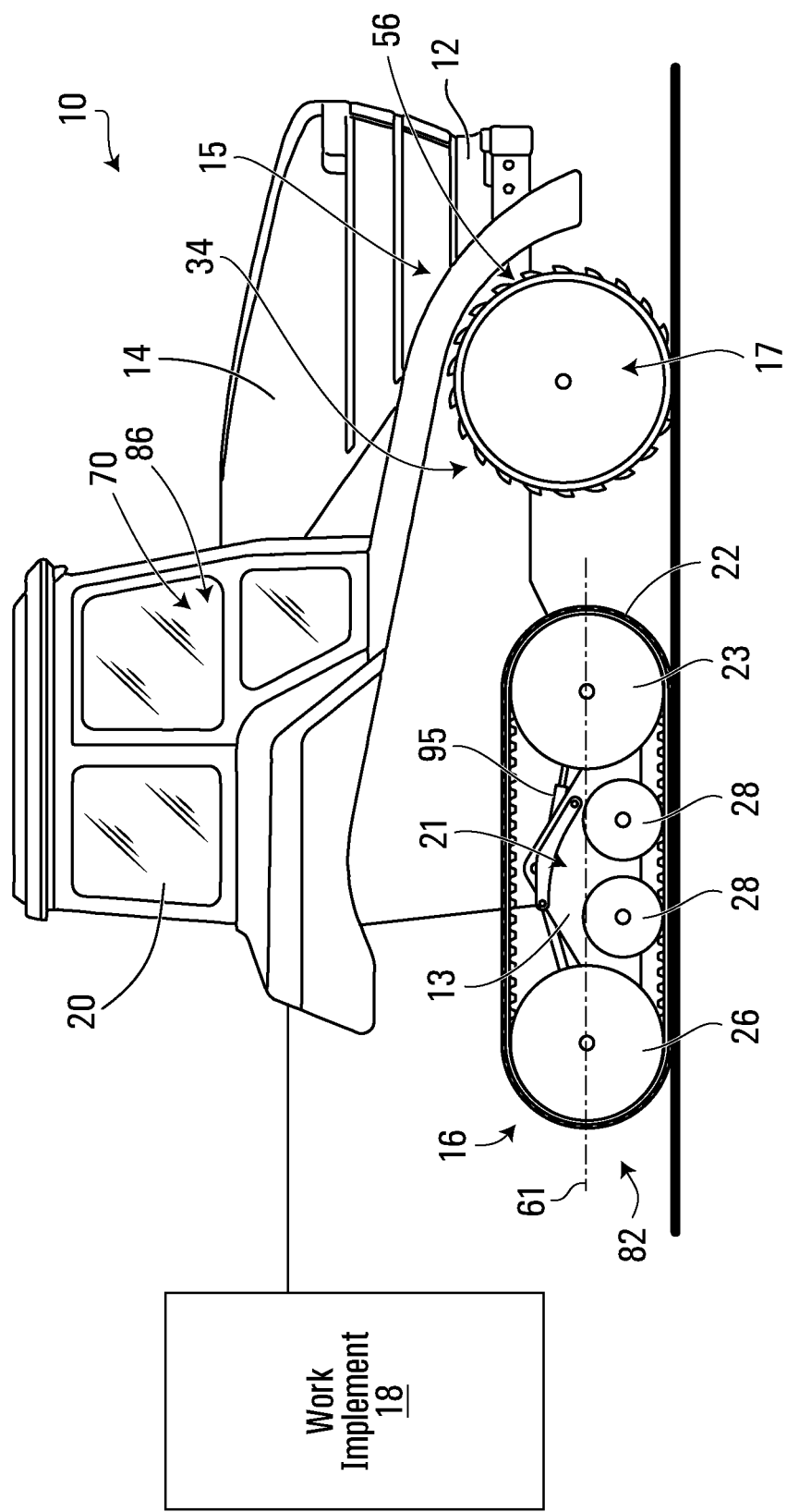
FIG. 1 shows an example of an agricultural vehicle comprising a track system in accordance with an embodiment.

FIG. 1 shows an embodiment of a vehicle 10 comprising track systems 16 including tracks 22 for traction of the vehicle 10 on a ground. In this embodiment, the vehicle 10 is a heavy-duty work vehicle for performing agricultural, construction or other industrial work. More particularly, in this embodiment, the vehicle 10 is an agricultural vehicle for performing agricultural work. In other examples, the agricultural vehicle 10 may be a harvester, a planter, or any other type of agricultural vehicle.

In this embodiment, the vehicle 10 comprises a frame 12, a powertrain 15, ground-engaging traction devices 17, a steering mechanism 18, a suspension 34, and an operator cabin 20 that enable a user to move the vehicle 10 on the ground, including on an agricultural field and possibly on a paved road (e.g., between agricultural fields), using the track systems 16 and perform work using a work implement 13. In this embodiment, the ground-engaging traction devices 17 include the track systems 16, which are located in a rear of the vehicle 10, and ground-engaging wheel assemblies 50 (e.g., tires on wheels), which are located in a front of the vehicle 10.

As further discussed below, in this embodiment, the agricultural vehicle 10 including the track systems 16 can be monitored (e.g., during operation of the agricultural vehicle 10) to obtain information regarding the agricultural vehicle 10, including information regarding the track systems 16, such as temperatures and/or other characteristics of wheels of the track systems 16 sensed by sensors associated with these wheels, which can be used to inform a user (e.g., the operator) and/or control the agricultural vehicle 10 (e.g., a speed of the agricultural vehicle 10), for properly aligning the tracks 22 and/or other purposes. This may be useful, for example, to help prevent rapid wear or other deterioration of the tracks 22 and/or for various other reasons.

The powertrain 15 is configured for generating motive power and transmitting motive power to respective ones of the ground-engaging traction devices 17 of the vehicle 10 to propel the agricultural vehicle 10 on the ground. To that end, the powertrain 15 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with the respective ones of the ground-engaging traction devices 17. That is, the powertrain 15 transmits motive power generated by the prime mover 14 to the respective ones of the ground-engaging traction devices 17 in order to drive (i.e., impart motion to) them. The powertrain 15 may transmit power from the prime mover 14 to the respective ones of the ground-engaging traction devices 17 in any suitable way. In this embodiment, the powertrain 15 comprises a transmission between the prime mover 14 and final drive axles 56 for transmitting motive power from the prime mover 14 to respective ones of the ground-engaging traction devices 17. The transmission may be an automatic transmission (e.g., a continuously variable transmission (CVT) or any other suitable type of transmission.

In this embodiment, the ground-engaging wheel assemblies 50 are rotatable by power derived from the prime mover 14 to drive the vehicle 10. That is, power generated by the prime mover 14 and delivered over the powertrain 15 of the agricultural vehicle 10 can rotate a final drive axle 56, which causes rotation of the ground-engaging wheel assemblies 50, which in turn imparts motion to the vehicle 10. In this example, the ground-engaging wheel assemblies are disposed at the front of the vehicle 10 and are in front of the track systems 16. In other embodiments, the track systems 16 may also or instead receive power generated by the prime mover 14 and delivered over the powertrain 15 to propel the vehicle 10.

The work implement 18 is used to perform agricultural work. For example, in some embodiments, the work implement 18 may be a combine head, a cutter, a scraper, a tiller, or any other type of agricultural work implement.

The operator cabin 20 is where the operator sits and controls the agricultural vehicle 10. More particularly, the operator cabin 20 comprises a user interface 70 including a set of controls that allow the operator to steer the agricultural vehicle 10 on the ground and operate the work implement 18. For example, in this embodiment, the user interface 70 comprises an accelerator, a brake control, and a steering device that are operable by the operator to control motion of the agricultural vehicle 10 on the ground and operation of the work implement 18. The user interface 70 also comprises an instrument panel (e.g., a dashboard) which provides indicators (e.g., a speedometer indicator, a tachometer indicator, etc.) to convey information to the operator.

The track systems 16 engage the ground for traction of the agricultural vehicle 10. Each track system 16 comprises a track-engaging assembly 21 and a track 22 disposed around the track-engaging assembly 21. In this embodiment, the track-engaging assembly 21 comprises a plurality of track-contacting wheels which, in this example, includes front idler wheels 23, rear idler wheels 26 and a plurality of roller wheels 28. The track system 16 also comprises a frame 13 which supports various components of the track system 16, including the roller wheels 28. The track system 16 has a longitudinal axis 61 defining a longitudinal direction of the track system. The track system 16 has a first longitudinal end 57 and a second longitudinal end 59 that define a length of the track system 16. The track system 16 has a widthwise direction and a width that is defined by a width of the track 22. The track system 16 also has a height direction that is normal to its longitudinal direction and its widthwise direction.

The track 22 engages the ground to provide traction to the agricultural vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 2 to 6, the track 22 comprises an inner side 45, a ground-engaging outer side 47, and lateral edges $49_1$, $49_2$. The inner side 45 faces the wheels 23, 26, 28, while the ground-engaging outer side 47 engages the ground. A top run 65 of the track 22 extends between the longitudinal ends 57, 59 of the track system 16 and over the wheels 23, 26, 28, while a bottom run 66 of the track 22 extends between the longitudinal ends 57, 59 of the track system 16 and under the wheels 23, 26, 28. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thickness direction normal to its longitudinal and widthwise directions.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21. The carcass 36 comprises an inner surface 32 and a ground-engaging outer surface 31 that are opposite one another.

In this embodiment, the carcass 36 comprises a plurality of reinforcements embedded in its elastomeric material 38. These reinforcements can take on various forms.

For example, in this embodiment, the carcass 36 comprises a layer of reinforcing cables $37_1$-$37_M$ that are adjacent to one another and extend generally in the longitudinal direction of the track 22 to enhance strength in tension of the track 22 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the reinforcing cables $37_1$-$37_M$ and the layer of reinforcing fabric 43.

In this embodiment, the track 22 is a one-piece "jointless" track such that the carcass 36 is a one-piece jointless carcass. In other embodiments, the track 22 may be a "jointed" track (i.e., having at least one joint connecting adjacent parts of the track 22) such that the carcass 36 is a jointed carcass (i.e., which has adjacent parts connected by the at least one joint). For example, in some embodiments, the track 22 may comprise a plurality of track sections interconnected to one another at a plurality of joints, in which case each of these track sections includes a respective part of the carcass 36. In other embodiments, the track 22 may be a one-piece track that can be closed like a belt with connectors at both of its longitudinal ends to form a joint.

The inner side 45 of the track 22 comprises an inner surface 55 of the carcass 36 and a plurality of wheel-contacting projections 48 that project from the inner surface 55 and are positioned to contact at least some of the wheels 23, 26, 28 to guide the track 22. The wheel-contacting projections 48 can be referred to as "wheel-contacting lugs". Furthermore, since each of them is used to guide the track 22, the wheel-contacting lugs 48 can be referred to as "guide projections" or "guide lugs". In some examples of implementation, a guide lug 48 may interact with one or more of the idler wheels 23, 26 and/or the roller wheels 28 to guide the track 22 to maintain proper track alignment and prevent de-tracking without being used to drive the track 22.

In this example of implementation, the guide lugs 48 are arranged in a single row disposed longitudinally along the inner side 45 of the track 22. The guide lugs 48 may be arranged in other manners in other examples of implementation (e.g., in a plurality of rows that are spaced apart along the widthwise direction of the track 22).

In this embodiment, each guide lug 48 is an elastomeric guide lug in that it comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the guide lug 48. In other embodiments, the elastomeric material 67 may include another elastomer in addition to or instead of rubber (e.g., polyurethane elastomer). The guide lugs 48 may be provided on the inner side 45 in various ways. For example, in this embodiment, the guide lugs 48 are provided on the inner side 45 by being molded with the carcass 36.

Figure 7:
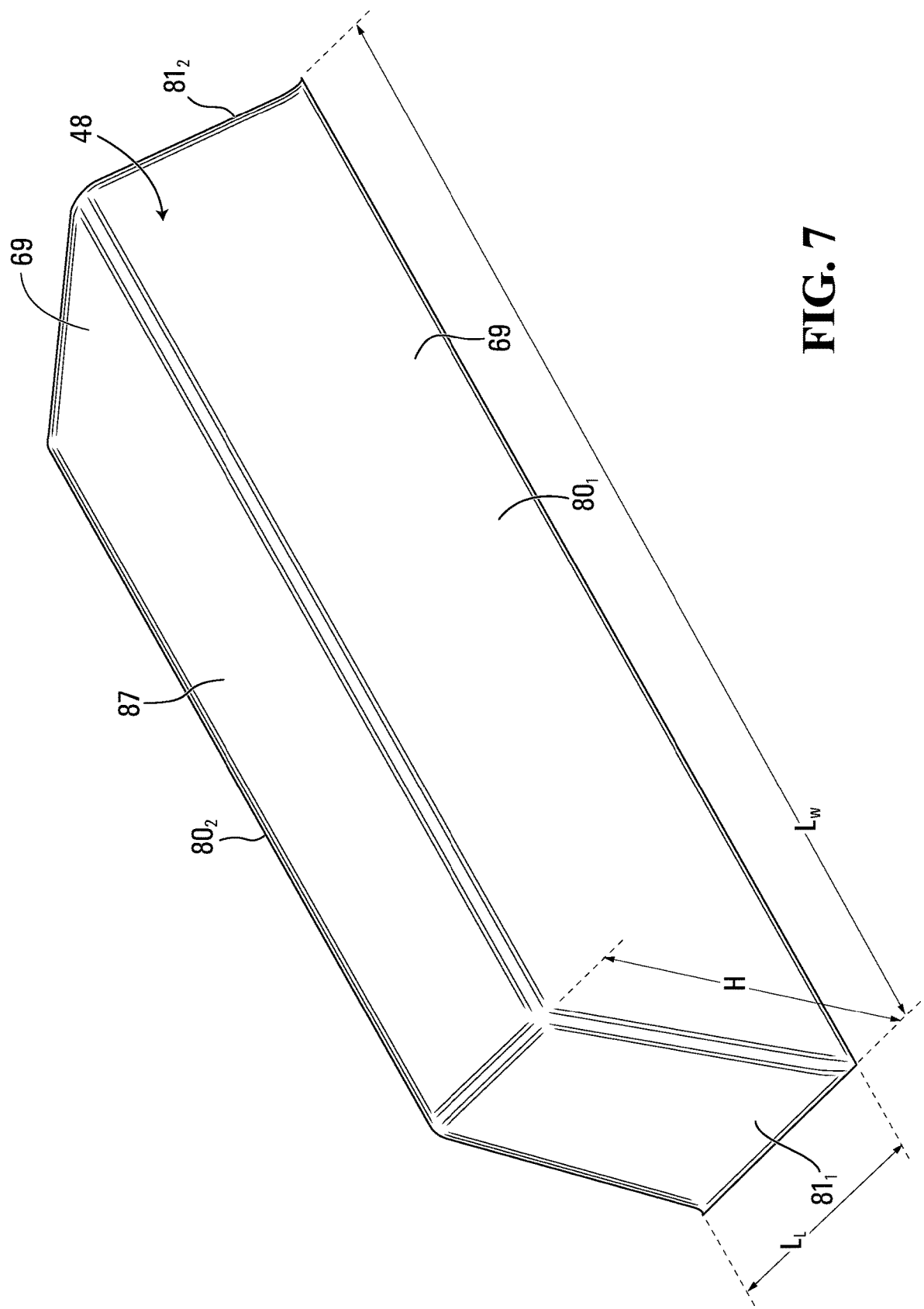
FIG. 7 shows a perspective view of a wheel-contacting projection of the track.

As shown in FIG. 7, each guide lug 48 has a periphery 69 which includes a front surface $80_1$, a rear surface $80_2$, two side surfaces $81_1$, $81_2$, and a top surface 87. The front surface $80_1$ and the rear surface $80_2$ are opposed to one another in the longitudinal direction of the track 22. The two side faces $81_1$, $81_2$ are opposed to one another in the widthwise direction of the track 22. In this embodiment, the front surface $80_1$, the rear surface $80_2$, and the side surfaces $81_1$, $81_2$ are substantially straight. The periphery 69 of the guide lug 48 may have any other shape in other embodiments (e.g., the front surface $80_1$, the rear surface $80_2$, and/or the side surfaces $81_1$, $81_2$ may be curved). The guide lug 48 has a front-to-rear dimension $L_L$ in the longitudinal direction of the track 22, a side-to-side dimension $L_W$ in the widthwise direction of the track 22, and a height H in the thickness direction of the track 22.

The ground-engaging outer side 47 comprises a ground-engaging outer surface 75 of the carcass 36 and a tread pattern 40 to enhance traction on the ground. The tread pattern 40 comprises a plurality of traction projections 58 projecting from the ground-engaging outer surface 75, spaced apart in the longitudinal direction of the track 22 and engaging the ground to enhance traction. The traction projections 58 may be referred to as "tread projections" or "traction lugs".

The traction lugs 58 may have any suitable shape. In this embodiment, each of the traction lugs 58 has an elongated shape and is angled, i.e., defines an oblique angle θ (i.e., an angle that is not a right angle or a multiple of a right angle), relative to the longitudinal direction of the track 22. The traction lugs 58 may have various other shapes in other examples (e.g., curved shapes, shapes with straight parts and curved parts, etc.).

In this embodiment, each traction lug 58 is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug 58. In other embodiments, the elastomeric material 41 may include another elastomer in addition to or instead of rubber (e.g., polyurethane elastomer). The traction lugs 58 may be provided on the ground-engaging outer side 27 in various ways. For example, in this embodiment, the traction lugs 58 are provided on the ground-engaging outer side 27 by being molded with the carcass 36.

The carcass 36 has a thickness $T_c$, measured from its inner surface 32 to its ground-engaging outer surface 31, which is relatively large in this embodiment. For example, in some embodiments, the thickness $T_c$ of the carcass 36 may be at least than 20 mm, in some cases at least 25 mm, in some cases at least 30 mm, in some cases at least 35 mm, and in some cases even more (e.g., 40 mm or more). The thickness $T_c$ of the carcass 36 may have any other suitable value in other embodiments.

The track 22 may be constructed in various other manners in other embodiments. For example, in some embodiments, the track 22 may have recesses or holes that interact with a drive wheel 24 in order to cause the track 22 to be driven (e.g., in which case the guide lugs 48 may be used only to guide the track 22 without being used to drive the track 22, i.e., they may be "guide lugs" only), and/or the ground-engaging outer side 47 of the track 22 may comprise various patterns of traction lugs.

Figure 2:
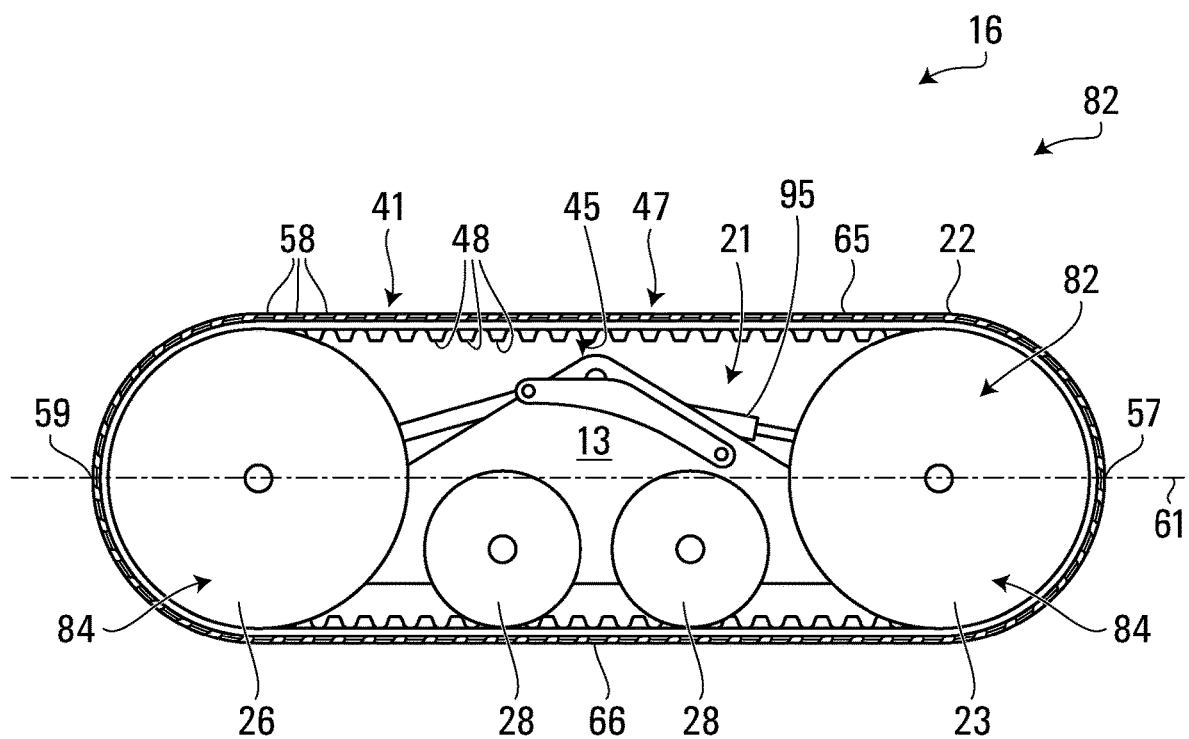
FIG. 2 shows a side view of a track of the track system.
Figure 4:
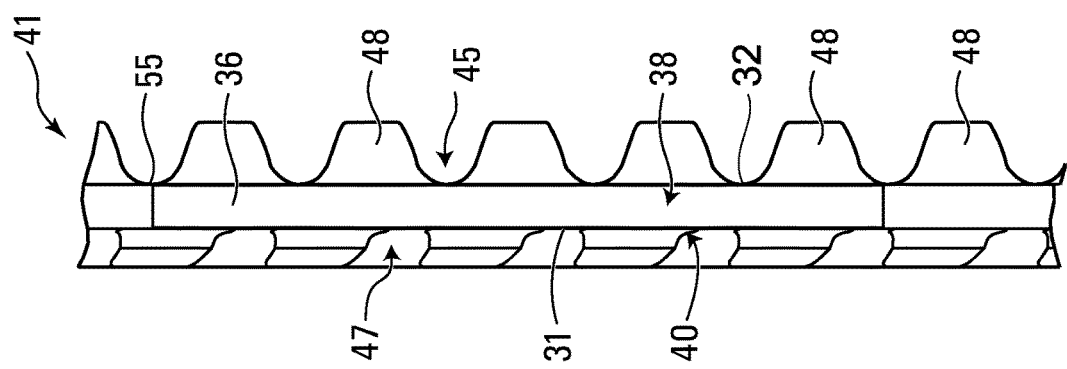
FIGS. 3 and 4 show a plan view and a side view of the track.
Figure 3:
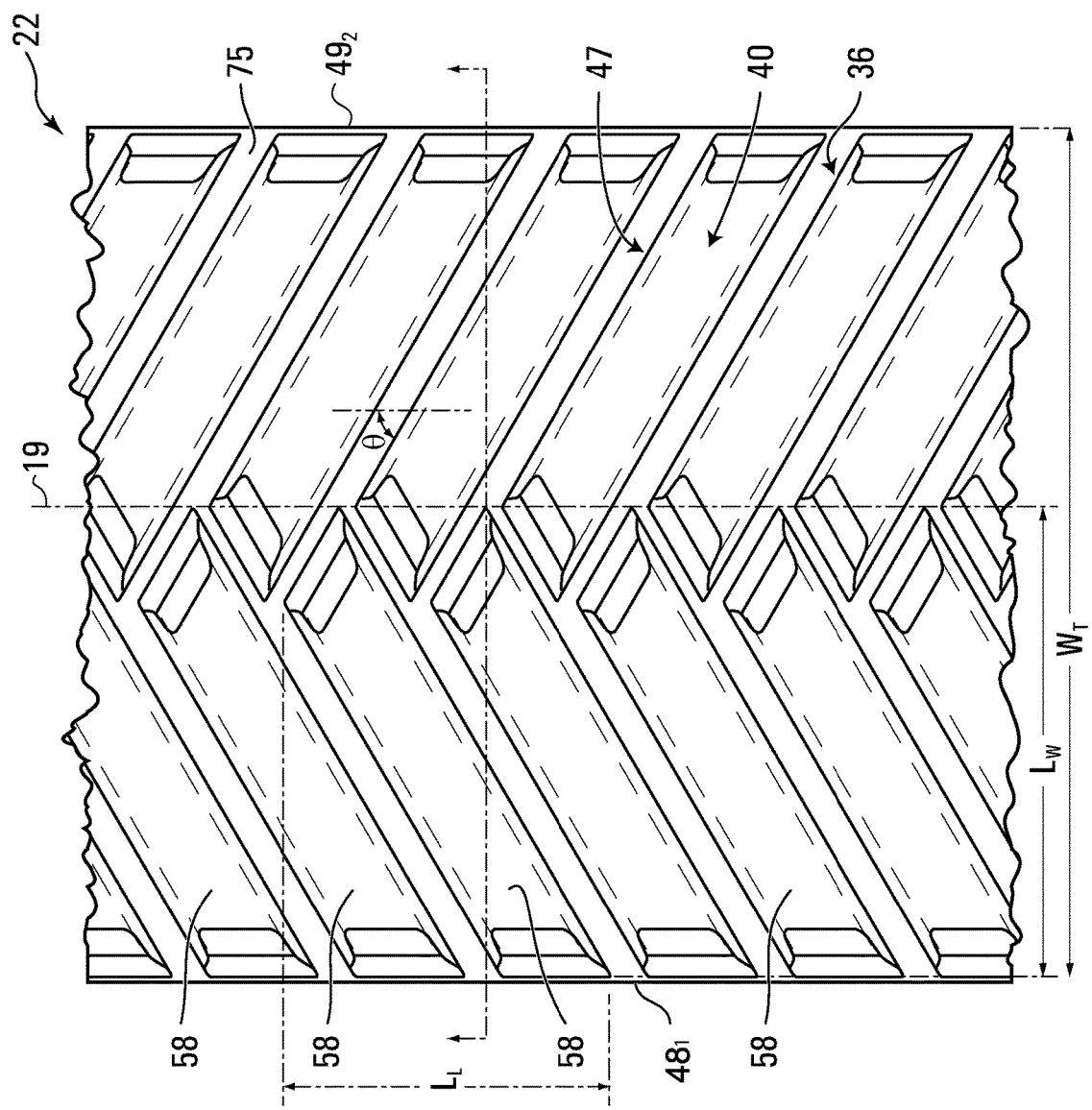
Figure 5:
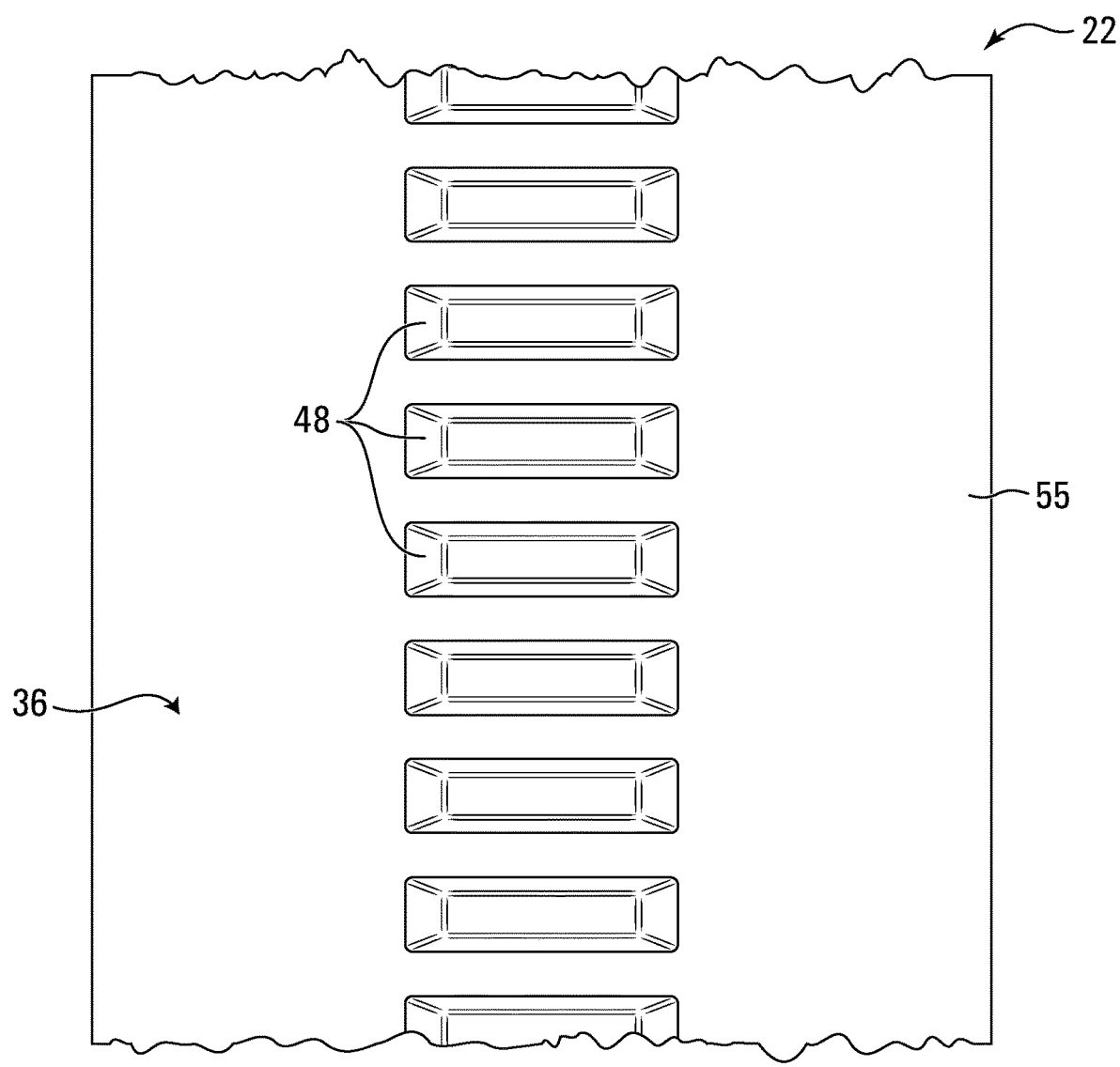
FIG. 5 shows an inside view of the track.
Figure 6:
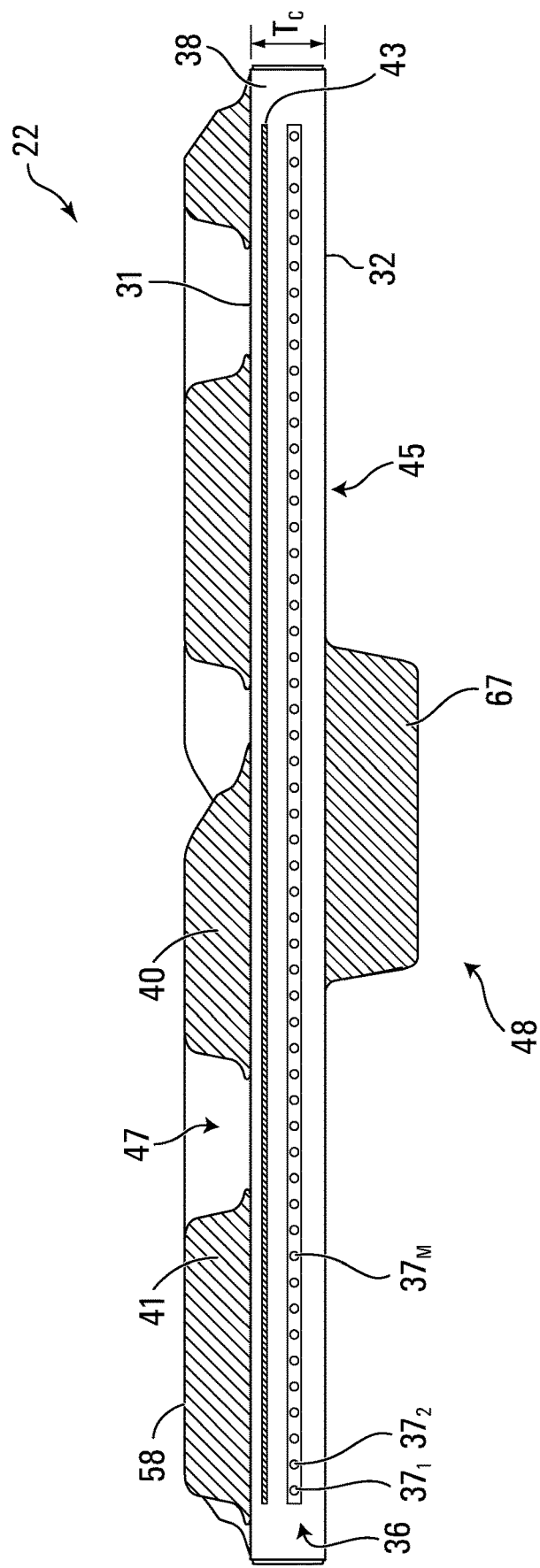
FIG. 6 shows a cross-sectional view of the track.

In this embodiment, with additional reference to FIG. 2, the track system 16 may comprise a tensioning mechanism 95 for tensioning the track 22 and controlling the tension of the track 22. For instance, in this embodiment, the tensioning mechanism 95 comprises an actuator mounted at one end to the frame 13 of the track system 16 and at another end to a hub of the front idler wheels 23. This allows the tensioning mechanism 95 to modify a distance between the front idler wheels 23 and the rear idler wheels 26 in the longitudinal direction of the track system 16.

Figure 8A:
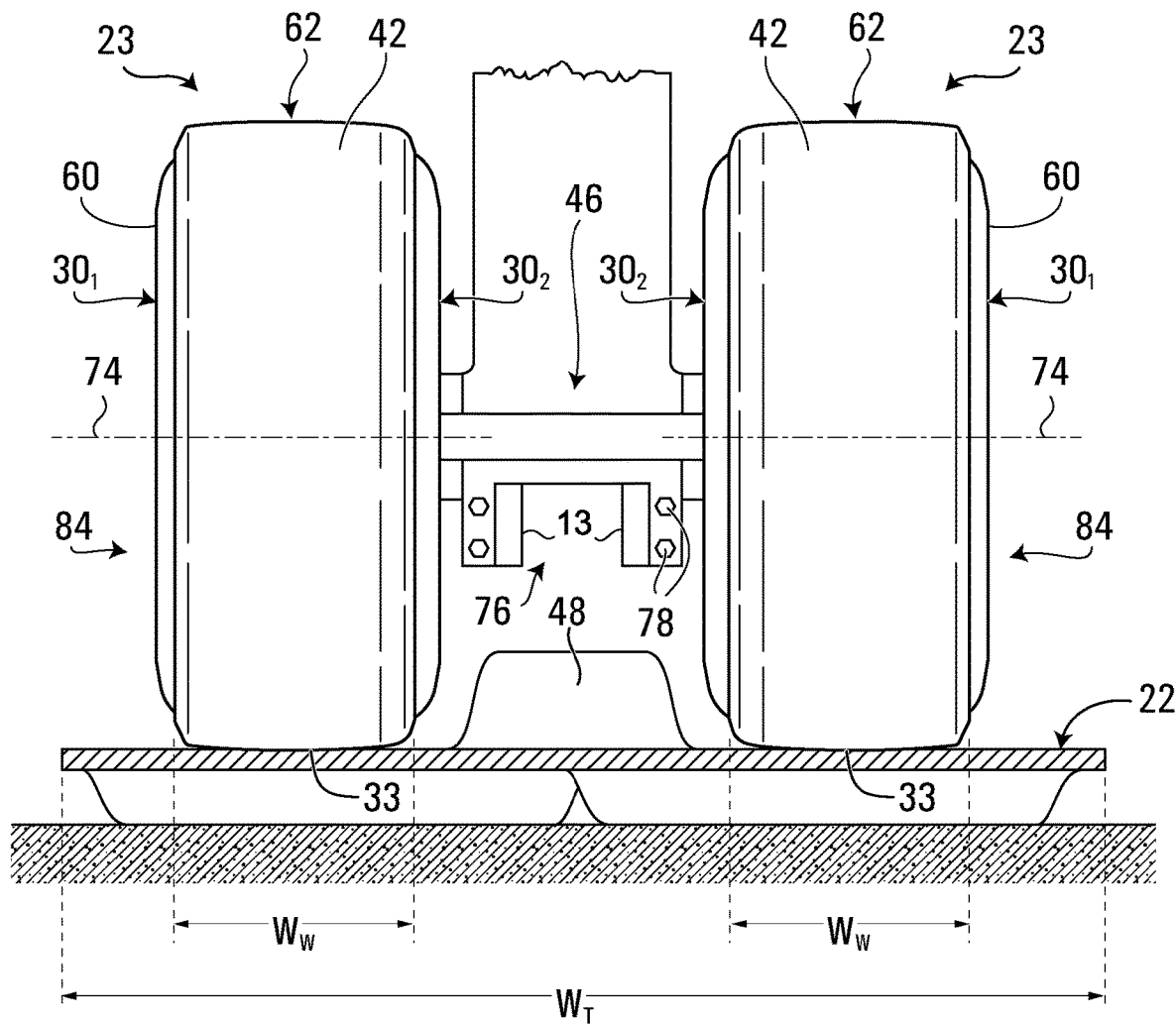
FIGS. 8A and 8B show respectively leading idler wheels and trailing idler wheels of a track-engaging assembly of the track system.
Figure 8B:
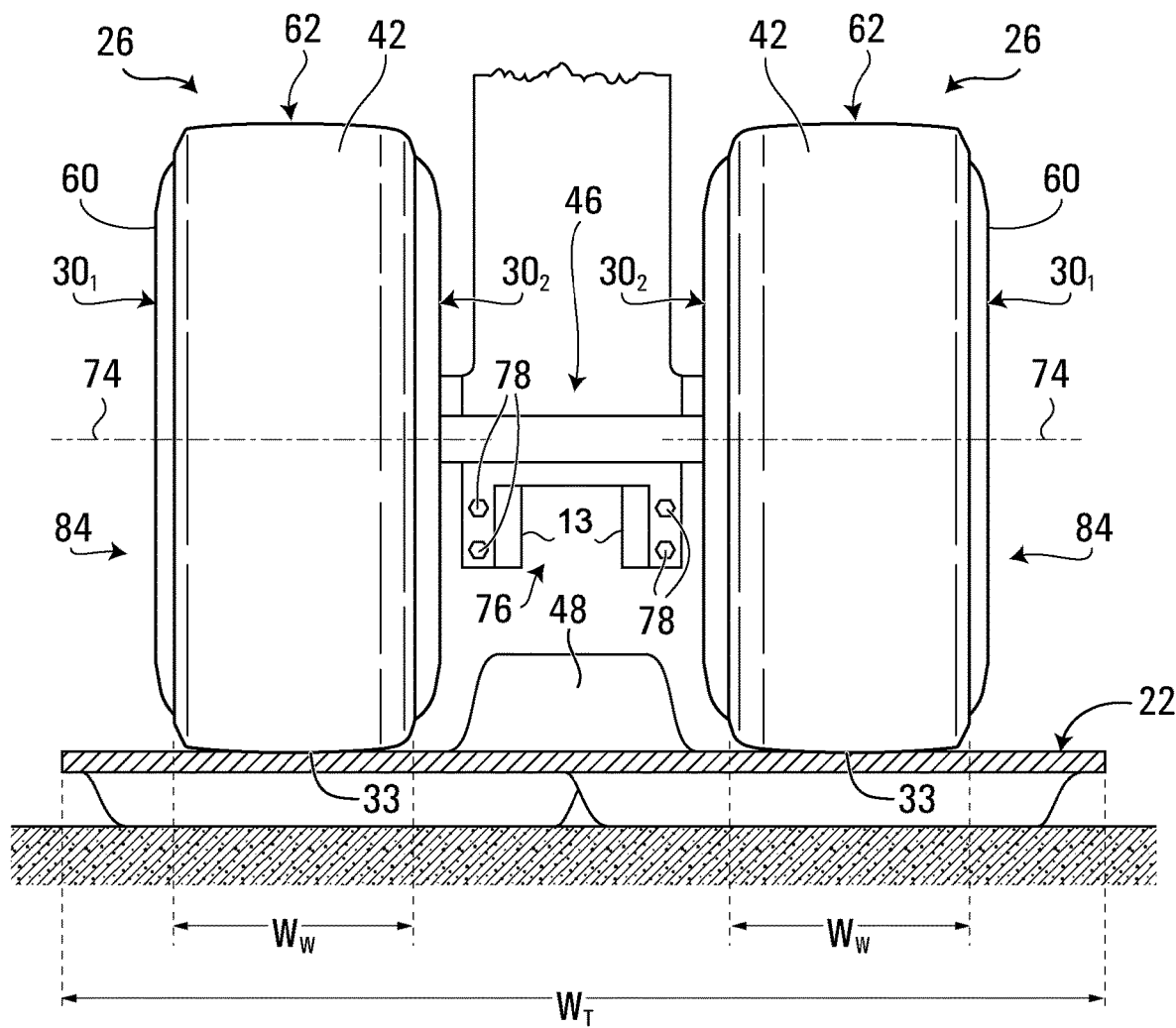
Figure 9:
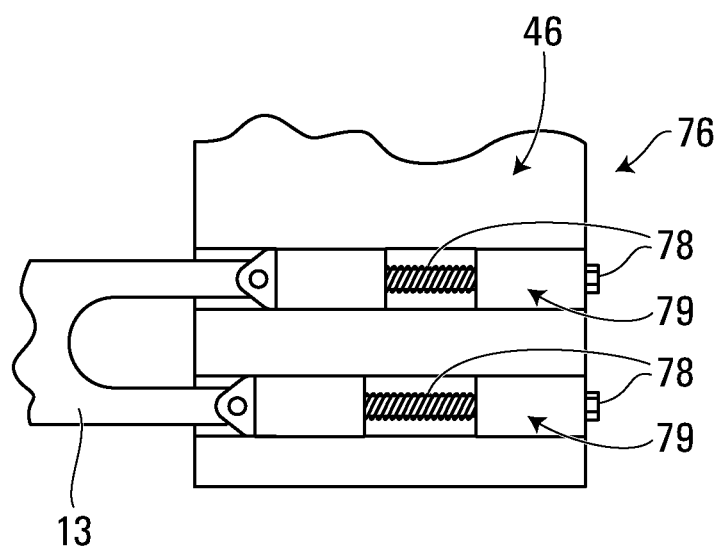
FIG. 9 shows an alignment mechanism of the track-engaging assembly of the track system.
Figure 10:
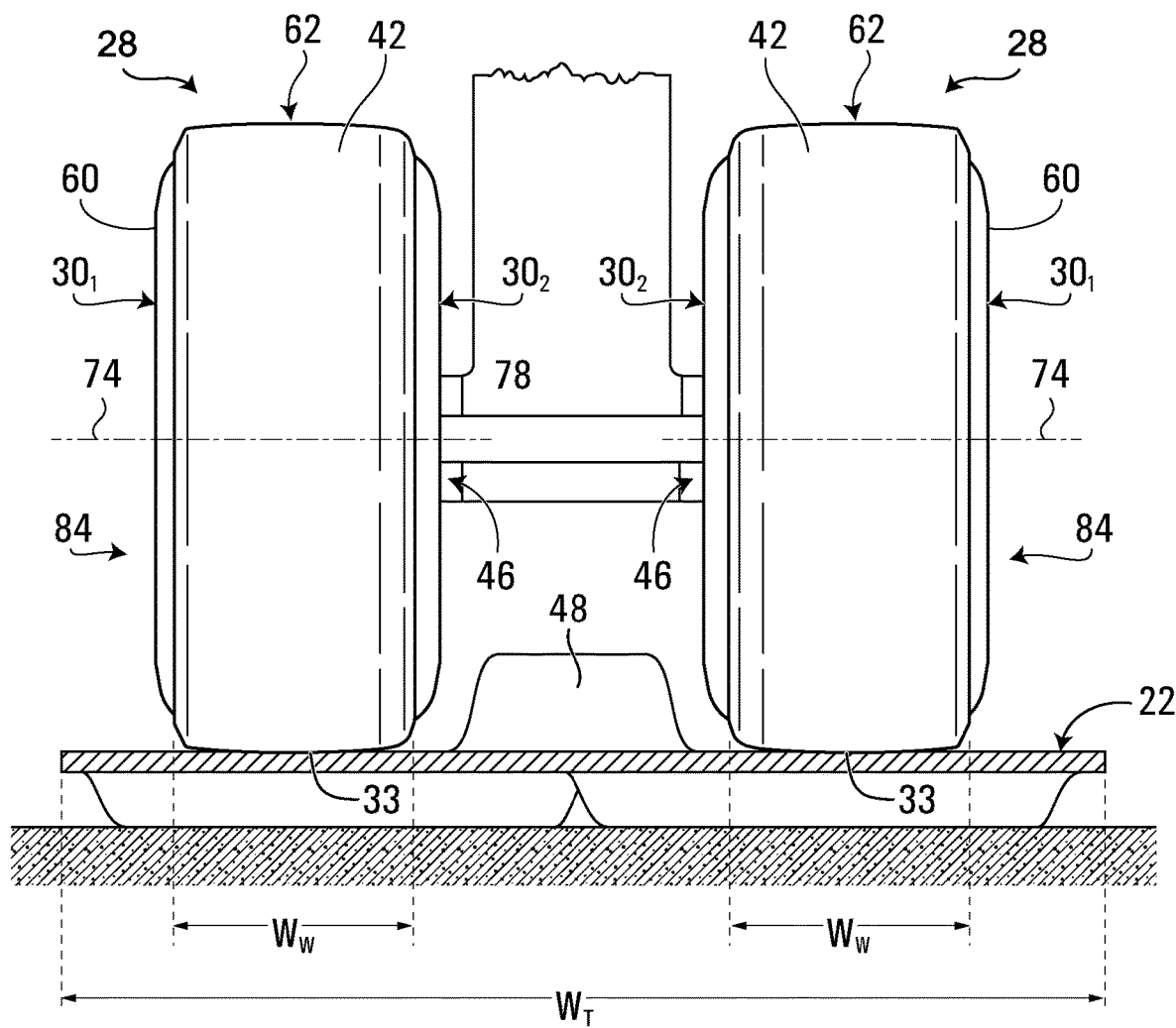
FIG. 10 shows mid-rollers of the track-engaging assembly of the track system.

In this embodiment, as shown in FIGS. 8A, 8B and 9, the track system 16 may comprise an alignment mechanism 76 for adjusting the idler wheels 23, 26 relative to the track 22 and ensure proper alignment of the track 22 relative to the track-engaging assembly 21. For instance, in this embodiment, the alignment mechanism 76 comprises an adjusting element 78 and an actuator 79 acting on the adjusting element. The adjusting element 78 may be of any suitable kind and may comprise, for example, a lever and/or a screw.

The idler wheels 23, 26 and the roller wheels 28 are not driven by power supplied by the prime mover 14, but are rather used to do at least one of supporting part of the weight of the agricultural vehicle 10 on the ground via the track 22, guiding the track 22, and tensioning the track 22. More particularly, in this embodiment, the front idler wheels 23 are leading idler wheels which maintain the track 22 in tension and help to support part of the weight of the agricultural vehicle 10 on the ground via the track 22, and the rear idler wheels 23 are trailing idler wheels which contribute to maintaining the track 22 in tension and help to support part of the weight of the agricultural vehicle 10 on the ground via the track 22. The roller wheels 28 roll on a rolling path 33 of the inner side 45 of the track 22 along the bottom run 66 of the track 22 to apply the bottom run 66 on the ground. In this case, as they are located between frontmost and rearmost ones of the wheels of the track system 16, the roller wheels 28 can be referred to as "mid-rollers".

Figure 11:
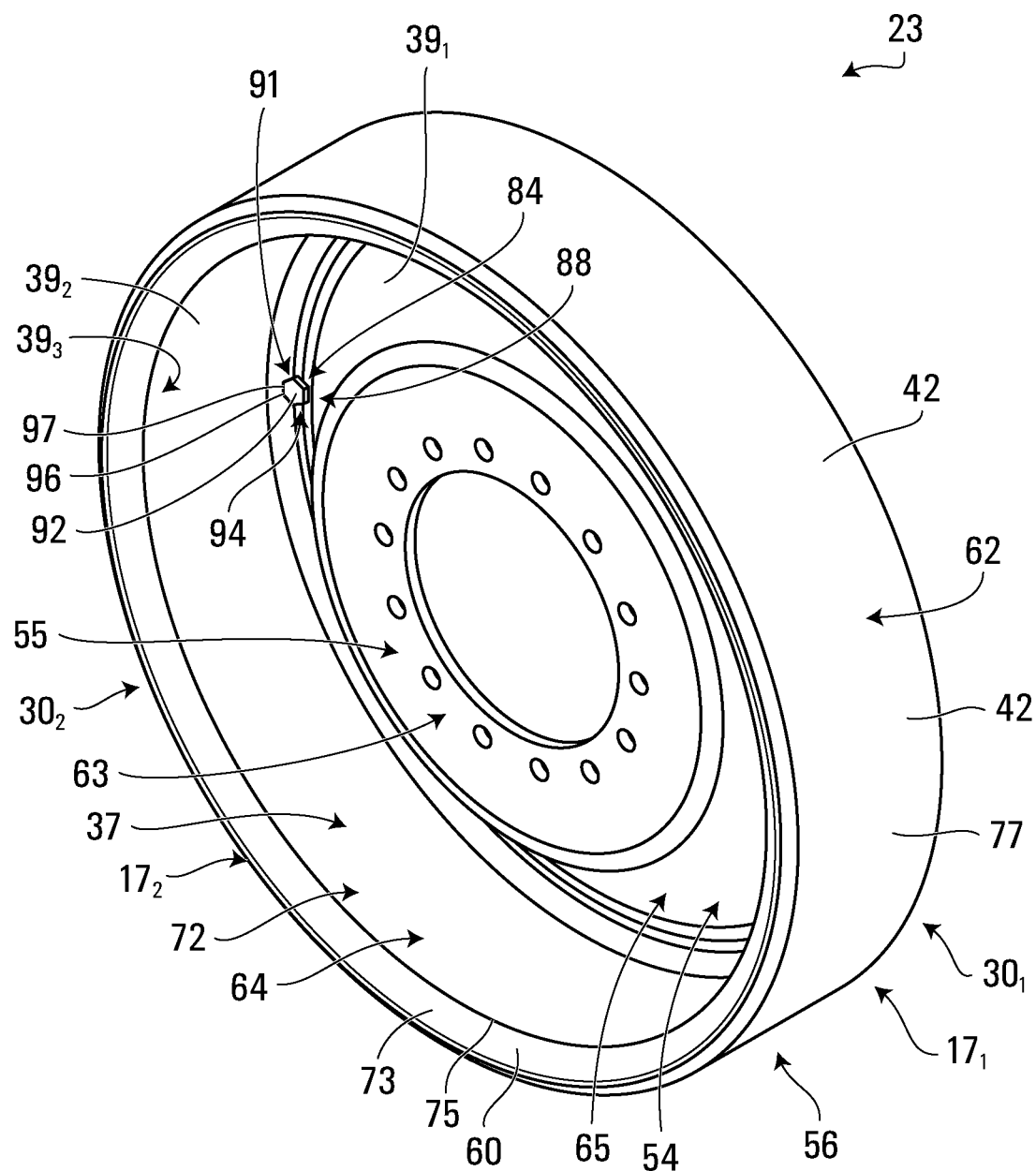
FIGS. 11 to 13 show a perspective view, a side view and a detailed side view of one of the idler wheels of the track-engaging assembly.
Figure 12:
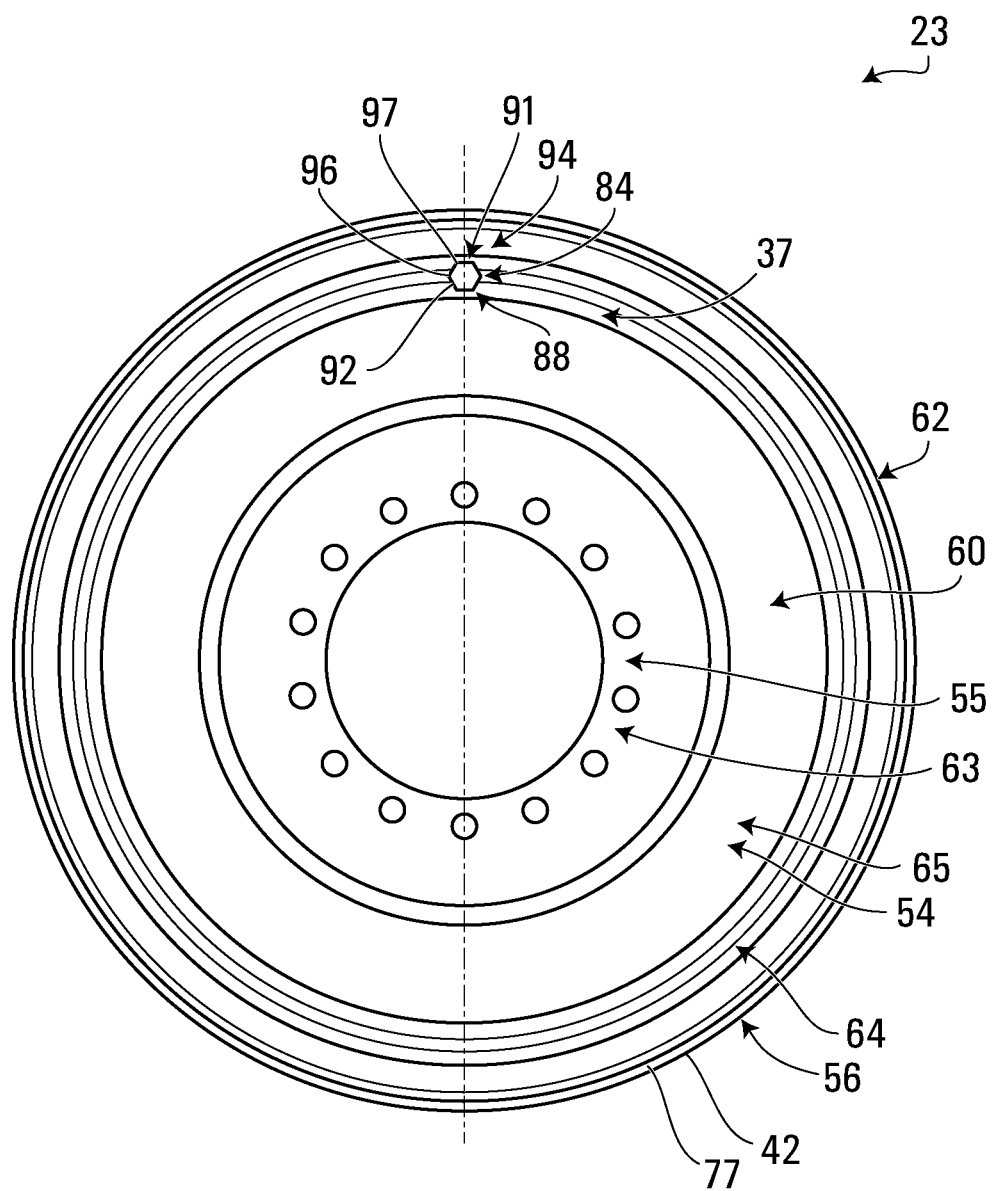
Figure 13:
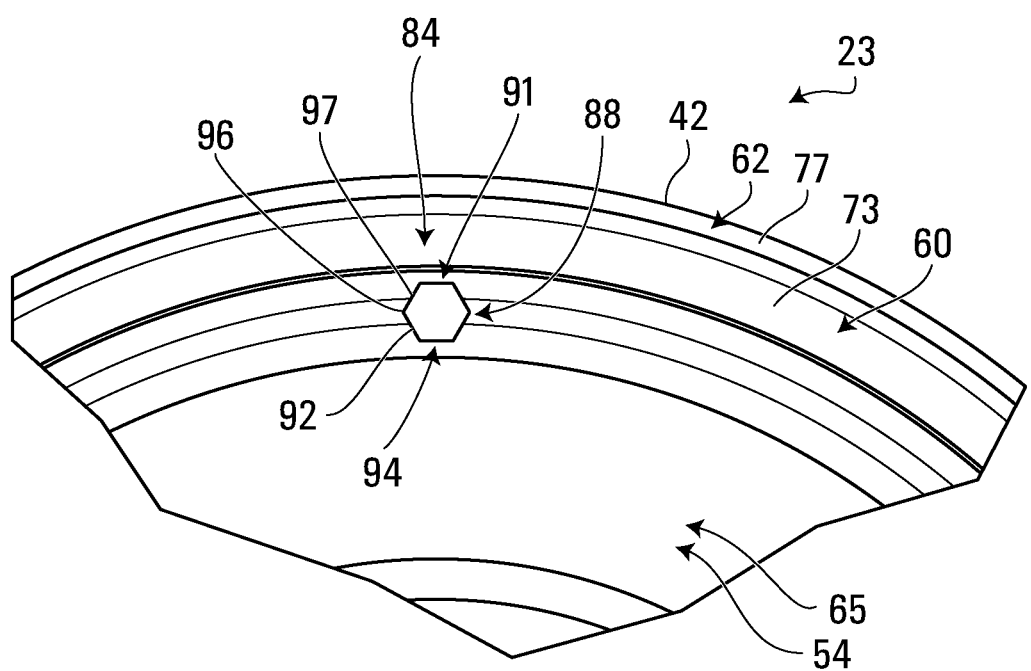
Figure 14:
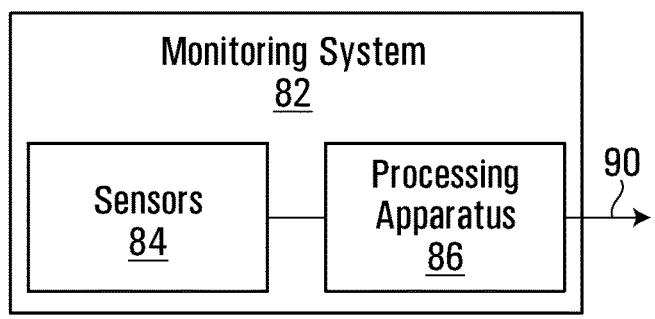
FIG. 14 is a block diagram of a monitoring system of the tracked vehicle comprising sensors and a processing apparatus in accordance with an embodiment.
Figure 15A:
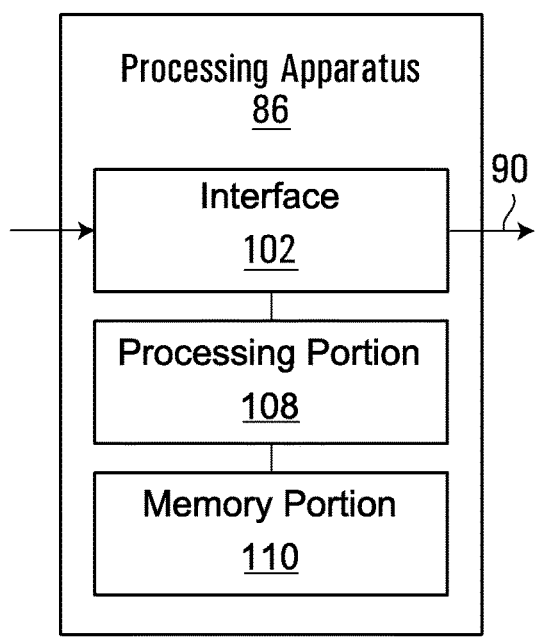
FIG. 15A is a block diagram of the processing apparatus.
Figure 15B:
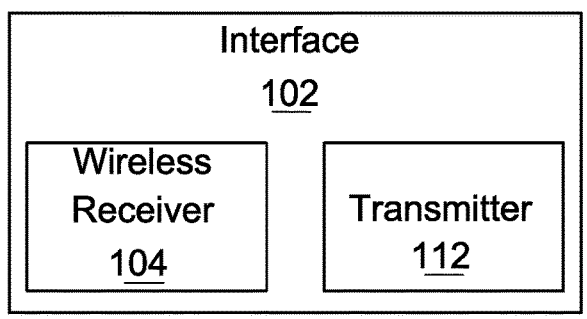
FIG. 15B is a block diagram of an interface of the processing apparatus.

With additional reference to FIGS. 11 to 13, each one of the idler wheels 23, 26 and mid-rollers 28 comprises a hub portion 55, a rim portion 56, and a radially-extending portion 54 between the hub portion 55 and the rim portion 56. The hub portion 55 is an inner portion of the idler wheel 23, 26 or mid-roller 28 which is associated with a hub 46 receiving an axle for the idler wheel 23, 26 or mid-roller 28. The rim portion 56 is an outer portion of the idler wheel 23, 26 or mid-roller 28 which contacts the inner side 45 of the track 22 and defines a periphery 62 and a circumferential surface of the idler wheel 23, 26 or mid-roller 28. The radially-extending portion 54 is an intermediate portion of the idler wheel 23, 26 or mid-roller 28 which extends radially between the hub portion 55 and the rim portion 56.

Each one of the idler wheels 23, 26 and mid-rollers 28 comprises a pair of lateral sides $30_1$, $30_2$ opposite one another and a peripheral side between the lateral sides $30_1$, $30_2$. Each of the lateral sides $30_1$, $30_2$ comprises a lateral surface 44 and the peripheral side comprises a circumferential surface 42. The circumferential surface 42 rolls on the inner side 45 of the track 22. More particularly, in this embodiment, the inner side 45 of the track 22 comprises a rolling path 33 on which the idler wheels 23, 26 and the mid-rollers 28 roll. The rolling path 33 is delimited by some of the guide lugs 48 such that, as the idler wheels 23, 26 rolls, these guide lugs 48 pass next to the idler wheels 23, 26. Each idler wheel 23, 26 and mid-roller 28 may have an axis of rotation 74, a widthwise direction defining a width $W_w$ of the idler wheel 23, 26 or mid-roller 28, a radial direction, and a circumferential direction.

Each one of the idler wheels 23, 26 and mid-rollers 28 may contact a guide lug 48 of the track 22 adjacent to it during motion of the track 22. More particularly, in this embodiment, the lateral side $30_2$ of each one of the idler wheels 23, 26 and mid-rollers 28 faces the guide lug 48, and comprises a projection-contacting portion 35 that can contact a respective guide lug 48 when the idler wheel 23, 26 or mid-roller 28 contacts the guide lug 48 as the guide lug 48 passes next to the idler wheel 23, 26 or mid-roller 28. The projection-contacting portion 35, which will be referred to as a "lug-contacting portion", has a shape that depends on respective shapes of the idler wheel 23, 26 or mid-roller 28 and the guide lug 48, but generally has a radial dimension C in a direction parallel to a radius R of the mid-roller 28 no greater than a height H of the guide lug 48.

The circumferential surface of the idler wheels 23, 26 and mid-rollers 28 may have any suitable dimensions and may occupy a significant part of the width of the track 22. For example, in some embodiments, a ratio of the width of the circumferential surface over the width $W_w$ of the idler wheel 23 may be at least 50%, in some embodiments at least 55%, in some embodiments at least 60%, in some embodiments at least 65%, in some embodiments at least 70%, in some embodiments at least 75%, in some embodiments at least 80%, in some embodiments at least 85%, in some embodiments at least 90%, in some embodiments at least 95%, in some embodiments even more (e.g. 99%, 100%), while in some embodiments the ratio of the width of the circumferential surface over the width $W_w$ of the idler wheel 23 may be less than 95%, in some embodiments less than 85%, in some embodiments less than 75%, in some embodiments less than 65%, in some embodiments less than 60% and in some embodiments even less (e.g. less than 55%). In a similar fashion, in some embodiments, the circumferential surface of the idler wheel 23 may occupy a majority of a width of the rolling path 33 of the track 22, in some embodiments two thirds of the width of the rolling path 33, in some embodiments three quarters of the width of the rolling path 33 and in some embodiments even more (e.g., seven eights of the rolling path 33, an entirety of the rolling path 33, etc.).

More particularly, in this embodiment, each of the idler wheels 23, 26 and the mid-rollers 28 comprises a rigid body 60 and a covering 62 on the rigid body 60 to improve performance of the idler wheel 23, 26 or mid-roller 28, such as by improving contact between the idler wheel 23, 26 or mid-roller 28 and the inner side 45 of the track 22, enhancing an abrasion resistance of the idler wheel 23, 26 or mid-roller 28, and/or by absorbing vibrations.

The rigid body 60 is a core of the idler wheel 23, 26 or mid-roller 28 that imparts structural integrity to the idler wheel 23, 26 or mid-roller 28. The rigid body 60 of the idler wheel 23, 26 or mid-roller 28 has lateral sides $17_1$, $17_2$ opposite one another and a circumferential surface 72 between the lateral sides $17_1$, $17_2$. In this case, the lateral sides $17_1$, $17_2$ of the rigid body 60 constitute parts of the sides $30_1$, $30_2$ of the idler wheel 23, 26 or mid-roller 28, while the circumferential surface 72 of the rigid body 60 of the idler wheel 23, 26 or mid-roller 28 is covered by the covering 62. The rigid body 60 comprises a rim portion 64, a hub portion 63, and a radially-extending portion 65 between the rim portion 64 and the hub portion 63.

In this embodiment, the hub portion 63 of the rigid body 60 of each idler wheel 23, 26 or mid-roller 28 constitutes the hub portion 55 of the respective idler wheel 23, 26 or mid-roller 28. The hub portion 63 of the rigid body 60 is thus associated with the hub 46.

The rim portion 64 of the rigid body 60 of each idler wheel 23, 26 or mid-roller 28 is part of the rim portion 56 of the respective idler wheel 23, 26 or mid-roller 28. The rim portion 64 comprises the circumferential surface 72 and outer parts of the lateral sides $17_1$, $17_2$ of the rigid body 60 of the idler wheel 23, 26 or mid-roller 28. In this embodiment, the rim portion 64 comprises a shoulder turning radially inwardly to form a flange 73 such that the edge 75 of the rim portion 64 are located radially inward of the circumferential surface 72 of the rigid body 60. More particularly, in this example, the shoulder 15 turns radially inwardly by curving radially inward (e.g., such that the flange 75 "curls"). In other examples, the shoulder 15 may turn radially inward by being slanted or otherwise angled radially inward and/or may be partially curved radially inward and partially slanted or otherwise angled radially inward (i.e., may comprise one or more curved segments and one or more angled segments). The rim portion 64 may be configured in various other ways in other embodiments (e.g., the rim portion 64 may not comprise any shoulder).

In this embodiment, the circumferential surface 72 of the rigid body 60 is parallel to the widthwise direction of the respective idler wheel 23, 26 or mid-roller 28. That is, when viewed in cross section, the circumferential surface 72 of the rigid body 60 is flat.

The radially-extending portion 65 of the rigid body 60 of each idler wheel 23, 26 or mid-roller 28 constitutes the radially-extending portion 54 of the respective idler wheel 23, 26 or mid-roller 28. The radially-extending portion 65 interconnects the hub portion 63 and the rim portion 64. In this embodiment, the radially-extending portion 65 and the hub portion 63 of the rigid body 60 constitute a one-piece component that is secured (e.g., welded) to the rim portion 64 of the rigid body 60, which is another one-piece component. The one-piece component constituted by the radially-extending portion 65 and the hub portion 63 of the rigid body 60 may sometimes be referred to as a "disk". The radially-extending portion 65 may be configured in various other ways in other embodiments.

In this embodiment, the hub portion 63, the rim portion 64, and the radially-extending portion 65 of the rigid body 60 define an internal hollow space 37 of the respective idler wheel 23, 26 or mid-roller 28 delimited by internal surfaces $39_1$-$39_3$ of the rigid body 60 of the respective idler wheel 23, 26 or mid-roller 28.

The rigid body 60 may be made of one or more materials. In some cases, the rigid body 60 may comprise a single material making up an entirety of the rigid body 60. In other cases, the rigid body 60 may comprise two or more different materials that make up different parts of the rigid body 60.

In this embodiment, the rigid body 60 is metallic, i.e., is at least mainly (i.e., mainly or entirely) made of a metallic material. The metallic material is selected to provide strength and rigidity to the idler wheel 23, 26 or mid-roller 28. For example, in this case, the metallic material comprises steel. In other cases, the metallic material may comprise another metal instead of steel. In other embodiments, the rigid body 60 may be at least mainly made of another type of material (e.g., composite material, polymeric material, or ceramic material). Also, in other embodiments, different parts of the rigid body 60 may be made of two or more materials (e.g., two types of steel).

Also, in this embodiment, at least part of the rigid body 60 is stamped into shape. That is, at least part of the rigid body 60 of the idler wheel 23, 26 or mid-roller 28 is formed by a stamping process. Notably, the rim portion 64, the hub portion 63 and the radially-extending portion 65 of the rigid body 60 may be stamped.

The rigid body 60 may comprise and/or be constituted of one or more stamped components. In this embodiment, the rim portion 64 of the rigid body 60 constitutes a first stamped component, while the hub portion 63 and the radially-extending portion 65 of the rigid body 60 of the wheel constitute a second one-piece component secured to the first one-piece component by any suitable means. For instance, the first stamped component and the second stamped component may be welded to one another (e.g., the second stamped component may be welded to the first stamped component or vice-versa).

The rigid body 60 of the idler wheels 23, 26 and the mid-rollers 28 may be manufactured in any other suitable way in other embodiments.

The covering 62 of each one of the idler wheels 23, 26 and mid-rollers 28 contacts the inner side 45 of the track 22 as the idler wheel 23, 26 or mid-roller 28 rolls on the inner side 45 of the track 22. The covering 62 includes at least part (i.e., some but less than all, or all) of the circumferential surface of the respective idler wheel 23, 26 or mid-roller 28. More specifically, in this embodiment, the covering 62 includes and thereby also defines the circumferential surface of the respective idler wheel 23, 26 or mid-roller 28 in its entirety. The covering 62 may also form at least part of one of the sides $30_1$, $30_2$ of the idler wheel 23, 26 or mid-roller 28 which faces a drive/guide lug 48 in other embodiments.

The covering 62 of each one of the idler wheels 23, 26 and mid-rollers 28 may covers at least part of the rigid body 60 of the respective idler wheel 23, 26 or mid-roller 28. In this embodiment, the covering 62 covers part of the rim portion 64 of the rigid body 60. More particularly, in this embodiment, the covering 62 covers the circumferential surface 72 of the rigid body 60.

The covering 62 of each one of the idler wheels 23, 26 and mid-rollers 28 may also define the circumferential surface and the periphery of the respective idler wheel 23, 26 or mid-roller 28. In this embodiment, the covering 62 comprises corners and an intermediate portion between the corners of the covering 62. More specifically, the intermediate portion of the covering 62 may comprise the circumferential surface 42 of the respective idler wheel 23, 26 or mid-roller 28.

In this embodiment, the covering 62 of each one of the idler wheels 23, 26 and mid-rollers 28 is generally centered over the respective idler wheel 23, 26 or mid-roller 28 such that the midpoint 99 of the covering 62 in the widthwise direction of the respective idler wheel 23, 26 or mid-roller 28 is the same as the midpoint of the respective idler wheel 23, 26 or mid-roller 28 in its widthwise direction.

The covering 62 may comprise and/or be constituted of an elastomeric material 77. In particular, in this embodiment, the elastomeric material is rubber.

In use, the idler wheels 23, 26 and the mid-rollers 28 are subject to friction, impacts and/or other loads that can affect their performance, the performance of the track 22, and/or the performance of the track assembly 16 as a whole. The idler wheels 23, 26 and the mid-rollers 28 may thus be designed to improve their performance, the performance of the track 22, and/or the performance of the track assembly 21 as a whole.

With additional reference to FIGS. 11 to 15B, in this embodiment, the vehicle 10 comprises a monitoring system 82 for monitoring the track systems 16 to obtain information about the track systems 16 which can be used for various purposes, such as, for example, to inform a user (e.g., the operator) and/or control the agricultural vehicle 10 based on a state of one or more of the track systems 16. Notably, in this embodiment, the monitoring system 82 is configured to monitor alignment of the track 22 of each track system 16. This may be useful, for example, to gain knowledge about the tracks 22 of the track systems 16, to help prevent rapid wear or other deterioration of the tracks 22 (e.g., blowout of one or more of the traction lugs 58), and/or to adapt the speed of the agricultural vehicle 10 in order to protect the tracks 22 while permitting the agricultural vehicle 10 to travel faster for short periods (e.g., when travelling on or crossing roads or other particular areas).

In particular, in this embodiment, the monitoring system 82 is configured to sense one or more characteristics (e.g., temperature, stress, strain, pressure, etc.) of one or more of the track-contacting wheels of the track-engaging assembly 21 of the track system 16, which includes the idler wheels 23, 26 and the mid-rollers 28 in this example, and to derive the information about the track system 16, which may be relevant for the alignment of the track 22. In some cases, such a characteristic of a given one of the track-contacting wheels may be indicative of a corresponding characteristic of the track 22, more specifically of a corresponding characteristic of at least some of the lugs 48 of the track 22. For example, in some cases, a temperature of a given one of the idler wheels 23, 26 and the mid-rollers 28 may be indicative of the temperature of the track 22, and more specifically of the temperature of at least some of the lugs 48 of the track 22. This may thus facilitate obtaining information about the track 22 without measuring it directly from the track 22.

In this embodiment, the monitoring system 82 comprises sensors 84 and a processing apparatus 86. Each sensor 84 may be configured to sense a characteristic of a respective one of the idler wheels 23, 26 and mid-rollers 28. The processing apparatus 86 may be configured to generate a signal 90 based on the characteristic of the respective one of the idler wheel 23, 26 and the mid-rollers 28. For conciseness, the sensors 84 configured to sense a characteristic of a front idler wheel 23 will be described below, but it should be understood that in some embodiments, at least some of (i.e. some of, a majority of or an entirety of) the sensors 84 are configured to sense a characteristic of the rear idler wheels 26 and/or the mid-rollers 28 and those sensors may be implemented in a similar fashion to the sensors 84 configured to sense a characteristic of the front idler wheels 23.

In this embodiment, each sensor 84 is configured to sense a characteristic of the idler wheel 23 and the processing apparatus 86 is configured to generate the signal 90 based on the characteristic of the idler wheel 23, 26.

In this embodiment, each one of the sensors 84 is mountable to its respective idler wheel 23. In particular, each one of the sensors 84 may be mountable to the projection-contacting region 35 of the idler wheel 23, and each one of the sensors 84 may be configured to be located on the respective idler wheel 23 within a distance Ds from a periphery of the respective idler wheel 23 that is no more than the height H of the lugs 48 of the track 22. More specifically, in this embodiment, each one of the sensors 84 is mounted to the rigid body 60 of the respective idler wheel 23 in the internal hollow space 37 of the rigid body 60 and spaced from the covering 62 of the respective idler wheel 23.

In this embodiment, each one of the sensors 84 is fastenable to its respective idler wheel 23. In particular, each one of the sensors 84 may be fastenable to its respective idler wheel 23 by a mechanical fastener 92. For example, in some embodiments, the mechanical fastener 92 may be a threaded fastener that can be actuated (e.g., turned) to connect, release, tighten or loosen the respective sensor 84 to the respective idler wheel 23. In some embodiments, also, each one of the sensors 84 may be fastenable to its respective idler wheel 23 by an adhesive. In some embodiments, each one of the sensors 84 may be fastenable to its respective idler wheel 23 by both the mechanical fastener 92 and the adhesive.

In this embodiment, the idler wheels 23, 26 comprise an opening 88 and the sensors 84 are mountable in the opening 88 of their respective idler wheels 23, 26. The opening 88 may extends through the idler wheels 23, 26 from the respective outer lateral sides $30_1$ of the idler wheels 23, 26 to the inner lateral side $30_2$ of the idler wheels 23, 26 of the wheels opposite to the outer lateral side $30_1$ and configured to face the guide lugs 48.

As a result, in this embodiment, the sensors 84 may be substantially flush with a lateral surface 44 the outer lateral sides $30_1$ of the idler wheels 23, 26.

The sensors 84 may comprise a wireless transmitter 94 configured to wirelessly communicate with the processing apparatus 86.

In this embodiment, the sensors 84 are weatherproof. In particular, the sensors 84 may be configured to resist to abrasive and/or wet surrounding elements such as water, mud, sand, snow, ice, salt, etc., and to sense the characteristic of the idler wheels 23, 26 even when the sensors 84 are exposed to the abrasive and/or wet surrounding elements. For example, the sensors 84 may be configured to sense the characteristic of the idler wheels 23, 26 even when at least part of (i.e., part of, a majority of, or an entirety of) the sensors 84 are exposed to the abrasive and/or wet surrounding elements. This may be achieved by any suitable means. For example, in this embodiment, the openings 88 of the idler wheels 23, 26 may isolate the sensors 84 and protect the sensors 84 from abrasive and/or wet surrounding elements. Further, in some embodiments, each sensor 84 may comprise a sensing device 91 configured to sense the characteristic of the respective idler wheel 23, 26, and a housing 96 that houses and protects the sensing device 91. In particular, the housing 96 may comprise a protective substance 97 over the sensing device 91. More specifically, in this embodiment, the protective substance may hermetically seal the sensing device 91. The protective substance 97 may be malleable during application of the protective substance 97 onto the sensing device 91. For example, the protective substance 97 may comprise an elastomeric substance and/or rubber. The protective substance 97 may also comprise a paste or a liquid which solidifies after application of the paste or liquid over the sensing device. For example, the protective substance may comprise epoxy resin.

In this embodiment, each one of the sensors 84 are temperature sensors configured to sense a temperature of a respective idler wheel 23. The processing apparatus 86 may be configured to generate a signal 90 based on the temperature of the idler wheels 23, 26.

In particular, it has been found that characteristics of the idler wheels 23, 26 (e.g., stress, strain, temperature) and/or of the mid-rollers 28 may be indicative of characteristics (e.g., stress, strain, temperature, alignment) of the track 22 and of malfunctions of the track system 16, if there is any. For example, the track 22 may sometimes be misaligned with the track-engaging assembly 21. In particular, it has been found that track misalignments, which are damageable and may cause blowout of the track 22, may cause the idler wheels 23, 26 to overheat. A method for monitoring alignment of the tracks 22 of the vehicle 10 may thus comprise the steps of using the sensors 84 to sense the temperature of the idler wheels 23, 26, and generating the signal 90 relating to alignment of the tracks 22 based on the temperature of the wheels 23, 26.

In this embodiment, the processing apparatus 86 is configured to determine characteristics of the track 22 based on characteristics of the idler wheels 23, 26. More specifically, the processing apparatus 86 is configured to assess alignment of the track 22 based on the temperature of the idler wheels 23, 26.

Accordingly, in this embodiment, the processing apparatus 86 is configured to generate a signal 90 relating to the alignment of the track 22 based on the temperature of the idler wheels 23, 26. In order to do so, the processing apparatus may compare the temperature of the idler wheels 23, 26. For example, in this embodiment, the processing apparatus 86 may compare the sensed temperature of respective pairs of laterally aligned idler wheels 23, 26. If a difference of the sensed temperature between each wheel of a given one of the pairs of laterally aligned idler wheels 23, 26 is above a pre-determined threshold, the processing apparatus 86 may be configured to generate the signal 90 indicating that there is misalignment at the given one of the pairs of laterally aligned idler wheels 23, 26.

In this embodiment, the processing apparatus 86 comprises an interface 102, a processing portion 108, and a memory portion 110, which are implemented by suitable hardware and/or software.

The interface 102 comprises one or more inputs and outputs allowing the processing apparatus 86 to receive input signals from and send output signals to other components to which the processing apparatus 86 is connected (i.e., directly or indirectly connected), including, in this embodiment, the sensors 84. For example, in this embodiment, an input of the interface 102 is implemented by a wireless receiver 104 to receive a sensor signal from a sensor 84. An output of the interface 102 is implemented by a transmitter 112 to transmit the signal 90.

The processing portion 108 comprises one or more processors for performing processing operations that implement functionality of the processing apparatus 86. A processor of the processing portion 108 may be a general-purpose processor executing program code stored in the memory portion 110. Alternatively, a processor of the processing portion 108 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 110 comprises one or more memories for storing program code executed by the processing portion 108 and/or data used during operation of the processing portion 108. The memory portion 110 could also be used for storing data (e.g., temperature readings, reference temperatures). A memory of the memory portion 110 may be a semiconductor medium (including, e.g., a solid-state memory), a magnetic storage medium, an optical storage medium, and/or any other suitable type of memory. A memory of the memory portion 110 may be read-only memory (ROM) and/or random-access memory (RAM), for example.

In some embodiments, two or more elements of the processing apparatus 86 may be implemented by devices that are physically distinct from one another and may be connected to one another via a bus (e.g., one or more electrical conductors or any other suitable bus) or via a communication link which may be wired, wireless, or both. In other embodiments, two or more elements of the processing apparatus 86 may be implemented by a single integrated device. In some embodiments, the processing apparatus 86 is integrated into the vehicle itself during original manufacturing of the vehicle.

In this embodiment, the interface 102 may be configured to receive a speed signal indicative of the speed of the vehicle 10 and the processing apparatus 86 may be configured to assess the alignment of the track 22 and generate the signal 90 relating to alignment of the track 22 based on the speed of the vehicle 10 and the temperature of the idler wheels 23, 26. Specifically, in this non-limiting example, the processing apparatus 86 may be configured to assess the alignment of the track 22 based on comparison of the temperature of the idler wheels 23, 26 to reference data, and generate the signal 90 relating to the alignment of the track 22 when the temperature of the idler wheels 23, 26 at least reaches a reference value. As shown in FIGS. 24 to 29, the reference data may comprise temperature thresholds of the idler wheels 23, 26 depending on certain parameters, such as speed of the vehicle 10 and duration: if the temperature of the idler wheels 23, 26 indicates that the sensed temperature of the idler wheels 23, 26 is above the threshold, then the processing apparatus 86 may assess a misalignment of the track 22 and generate the signal 90.

The signal 90 may indicate when the track 22 is misaligned or otherwise not being properly used or is malfunctioning. For example, when a speed of the vehicle 10 is too great for a too long period of time, the track 22 may overheat and blowout. In such circumstances, the signal 90 may indicate to an operator of the vehicle 10 or to an owner of the vehicle 10 that there are track blowing risks, and/or may automatically reduce or at least limit the speed of the vehicle 10 to ensure that the track 22 does not blow. The signal 90 may thus relate to a speed of the vehicle 10 and, more particularly, may relate to a speed reduction and/or speed limit of the vehicle 10.

The signal 90 may be directed to any system of the vehicle 10.

Figure 16:
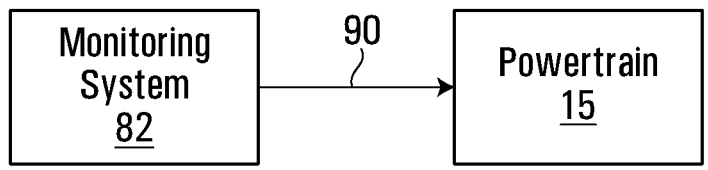
FIGS. 16 to 19 show variants of the monitoring system.

For example, in some embodiments, as shown in FIG. 16, the signal 90 may be directed to the powertrain 15 of the vehicle 10 to control the powertrain 15 of the vehicle 10. More specifically, in this example, the signal 90 may be directed to the powertrain 15 to control, limit and/or reduce the speed of the vehicle 10.

Figure 17:
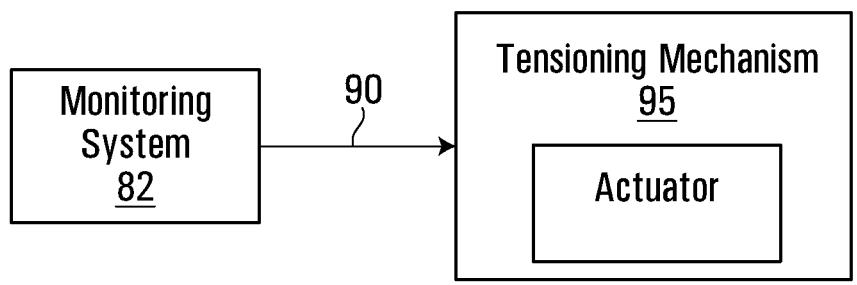
Figure 18:
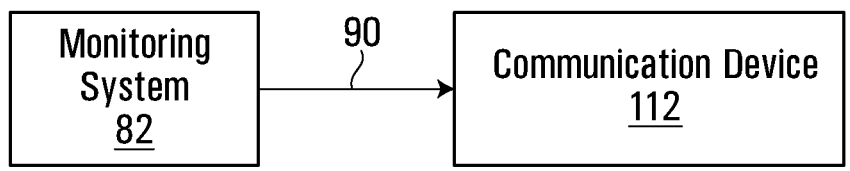

As another example, as shown in FIG. 17, in some embodiments, the signal 90 may be directed to the tensioning mechanism 95 to control the tensioning mechanism 95. More specifically, in this example, the signal 90 may be directed to the actuator of the tensioning mechanism 95 to control a tension of the track 22.

Figure 19:
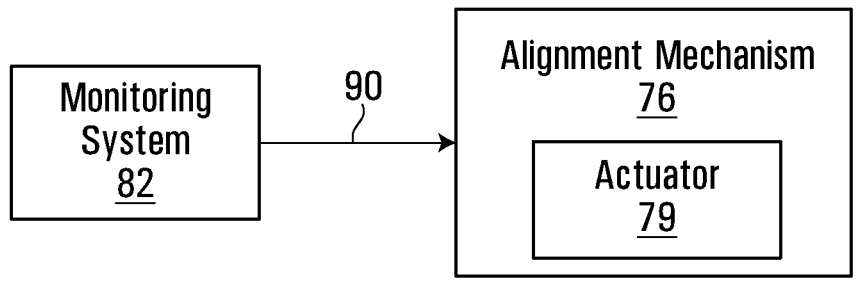

As another example, as shown in FIG. 19, in some embodiments, the signal 90 may be directed to the alignment mechanism 76 to control the alignment mechanism 76 and to actively maintain a proper alignment of the track 22 during use. More specifically, in this example, the signal 90 may be directed to the actuator 79 of the alignment mechanism 76 to control a tension of the track 22. For instance, the signal 90 may be indicative of a magnitude of the adjustment to be made to adjust the alignment of the track 22, and may accordingly command the actuator 79 of the alignment mechanism 76 to adjust the alignment of the track 22 to a specific degree of adjustment (e.g., a distance, a number of turns or of fractions of turn).

Figure 20:
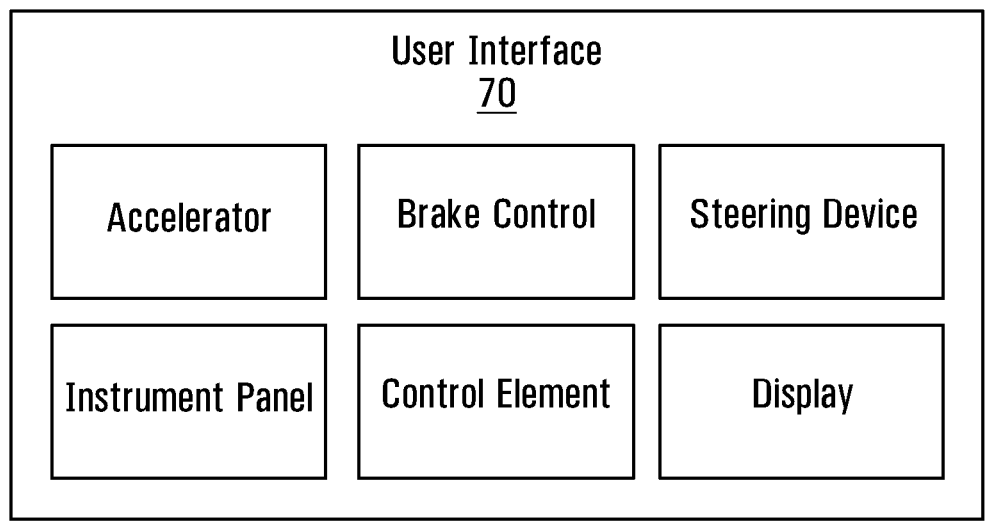
FIG. 20 shows a user interface of the tracked vehicle.

As another example, as shown in FIGS. 18 and 21 to 23, in some embodiments, the signal 90 is directed to a communication device 112 for conveying information to a user of the communication device 112. More specifically, in this example, the communication device 112 may comprise a user interface 114 for interacting with a user and a processing entity 116 for processing the signal 90 and generate a suitable user interaction depending on the signal 90. In this embodiment, the user interface 114 comprises a display 117 for displaying the information to the user and a speaker 118 for alerting the user of a notification or an alert. The user interface 114 may be part of the user interface 70 of the operator cabin 20 of the vehicle 10, as shown in FIG. 20. The information may comprise an indication of the temperature of the idler wheels 23, 26 and/or a notification based on the temperature of the idler wheels 23, 26. In this example, the notification may notify of an adjustment to be made to adjust alignment of the track 22, indicate a magnitude of the adjustment to be made to adjust the alignment of the track 22, request an authorization from the user to automatically adjust an alignment setting of the track system 16 (e.g. an actuation parameter of the actuator 79 of the alignment system 76, an tension parameter of the tensioner 95, etc.), notify of potential damage to the track 22, etc. More specifically, in this example, the indication of the magnitude of the adjustment to be made to adjust the alignment of the track 22 may comprise instructions such as a degree of adjustment (e.g., a number of turns or of fractions of turn) required on the actuator of the alignment mechanism 76.

Figure 21:
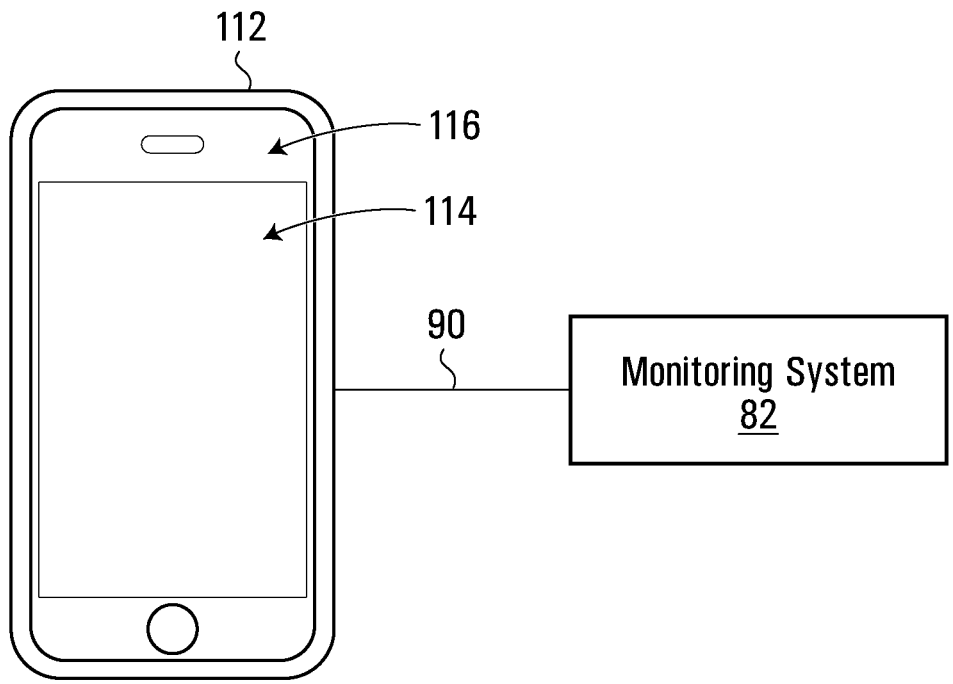
FIGS. 21 to 23 show an embodiment of the monitoring system wherein the monitoring system communicates with a communication device.
Figure 22:
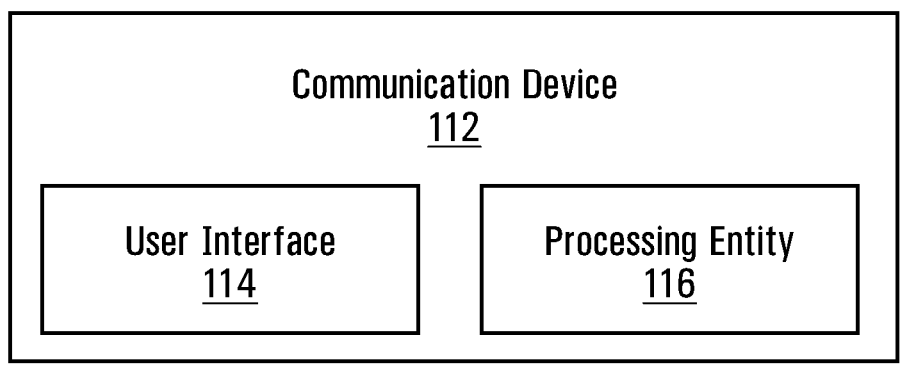
Figure 23:
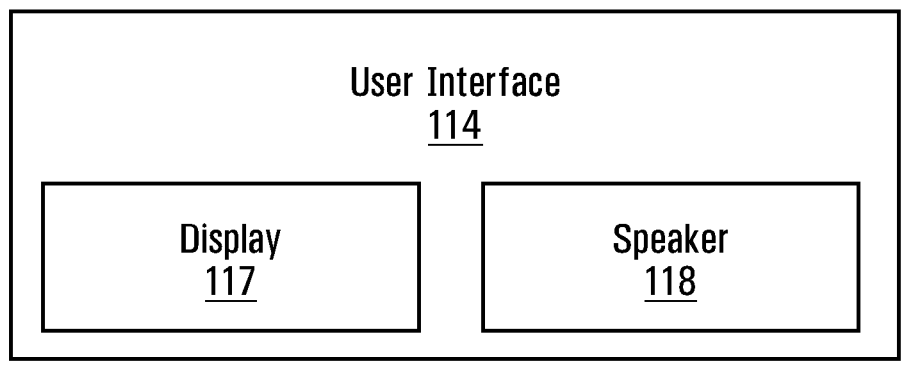
Figure 24:
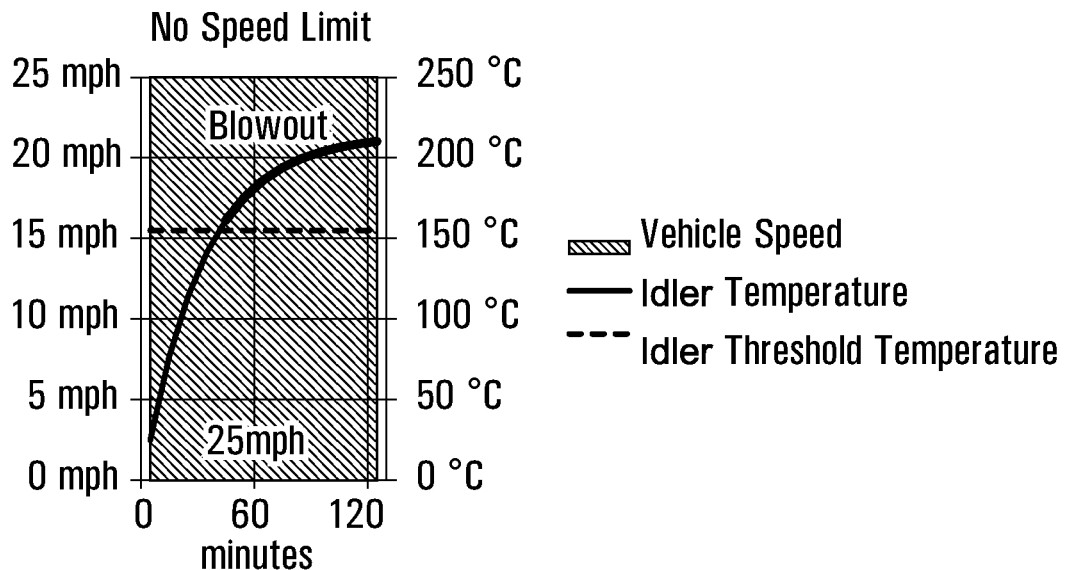
FIGS. 24 to 29 show examples of data generated by the monitoring system in comparison with reference data stored in memory
Figure 25:
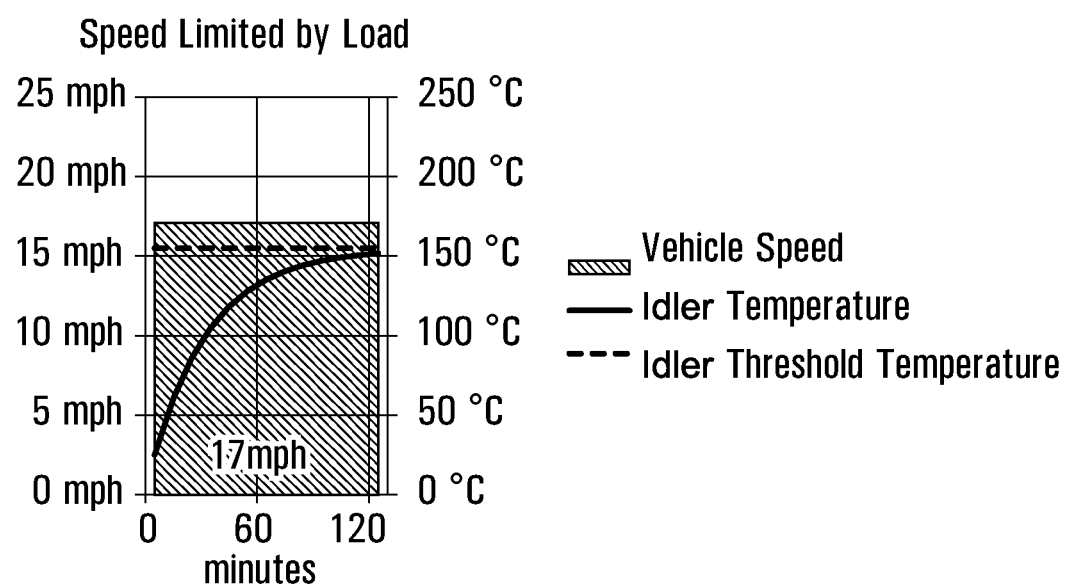
Figure 26:
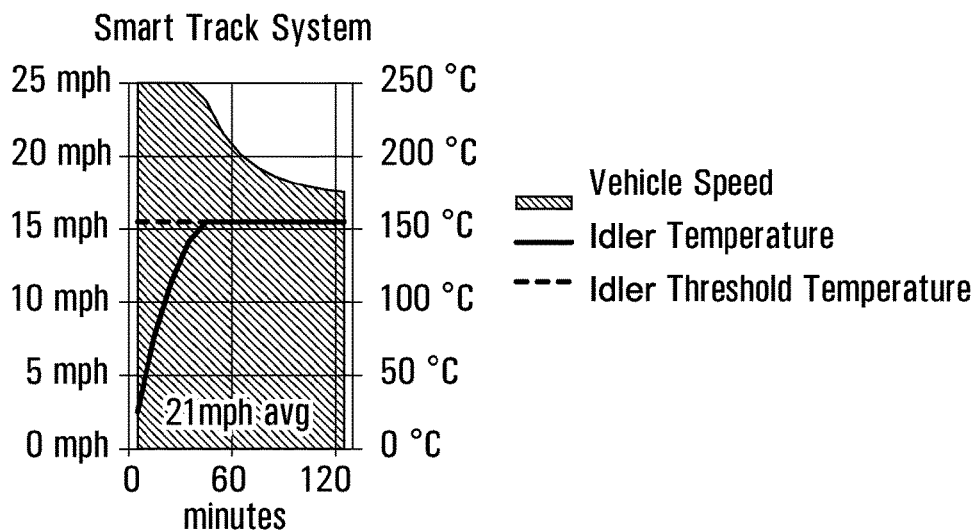
Figure 27:
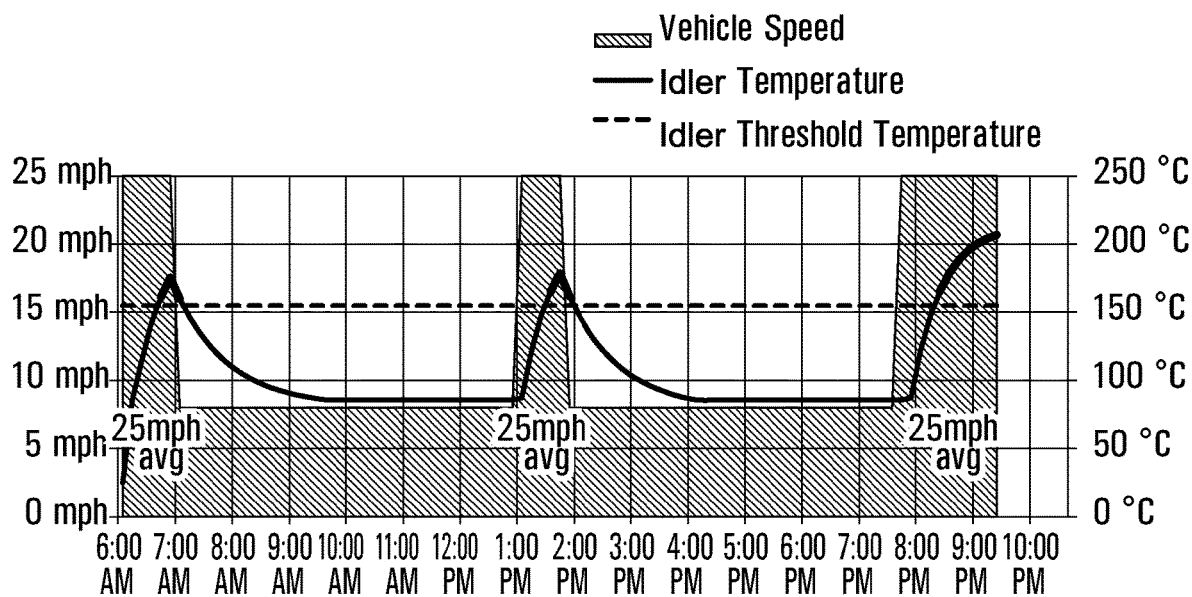
Figure 28:
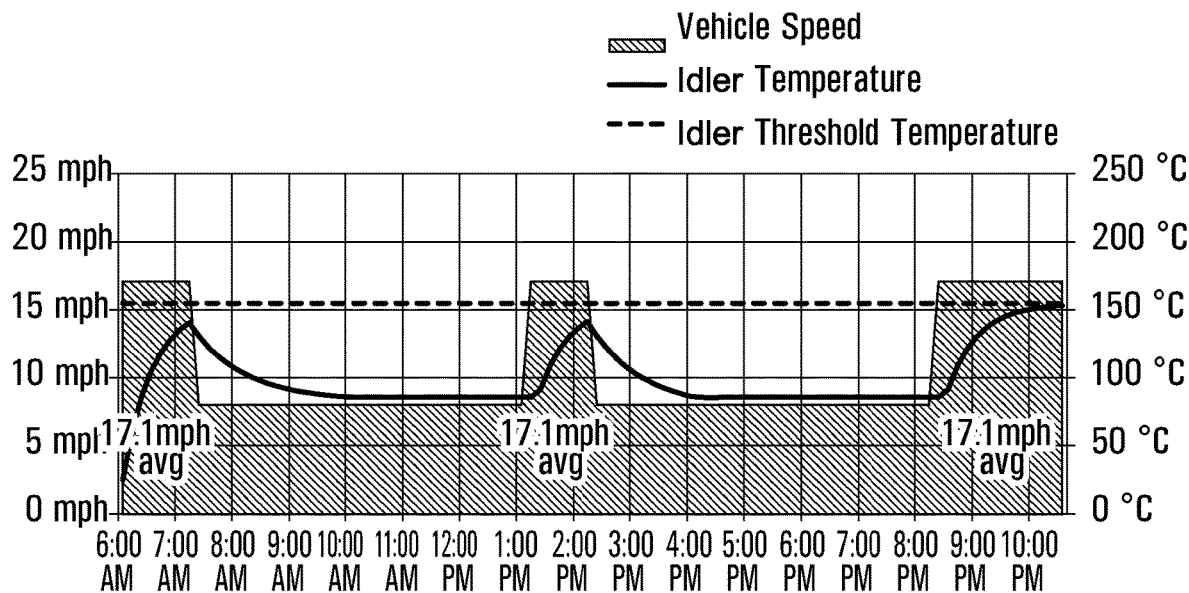
Figure 29:
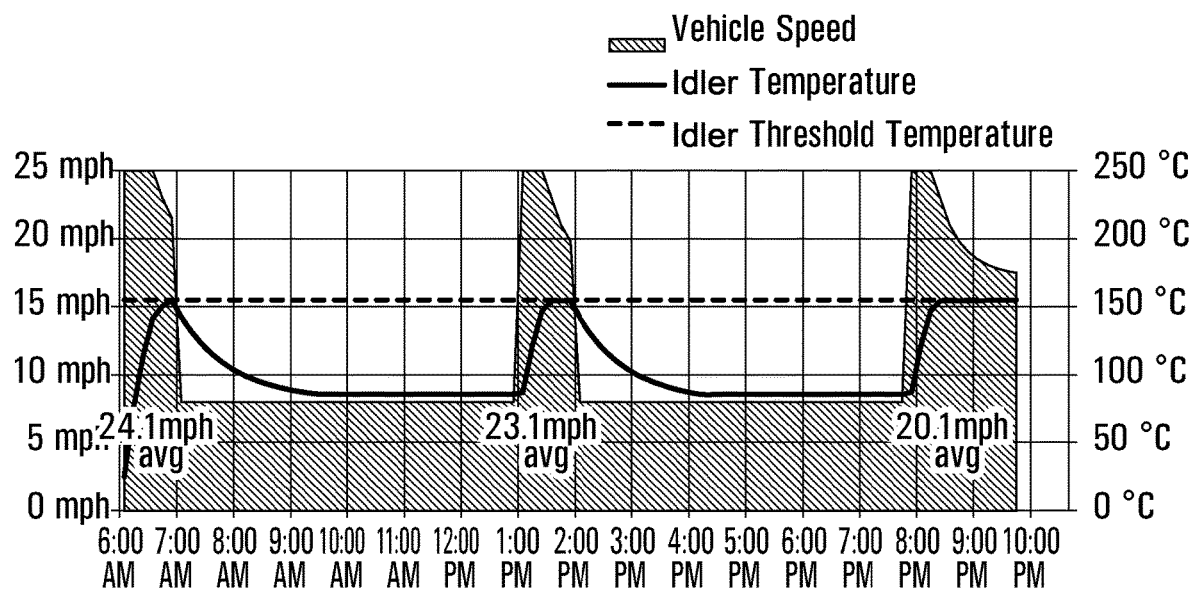
Figure 30:
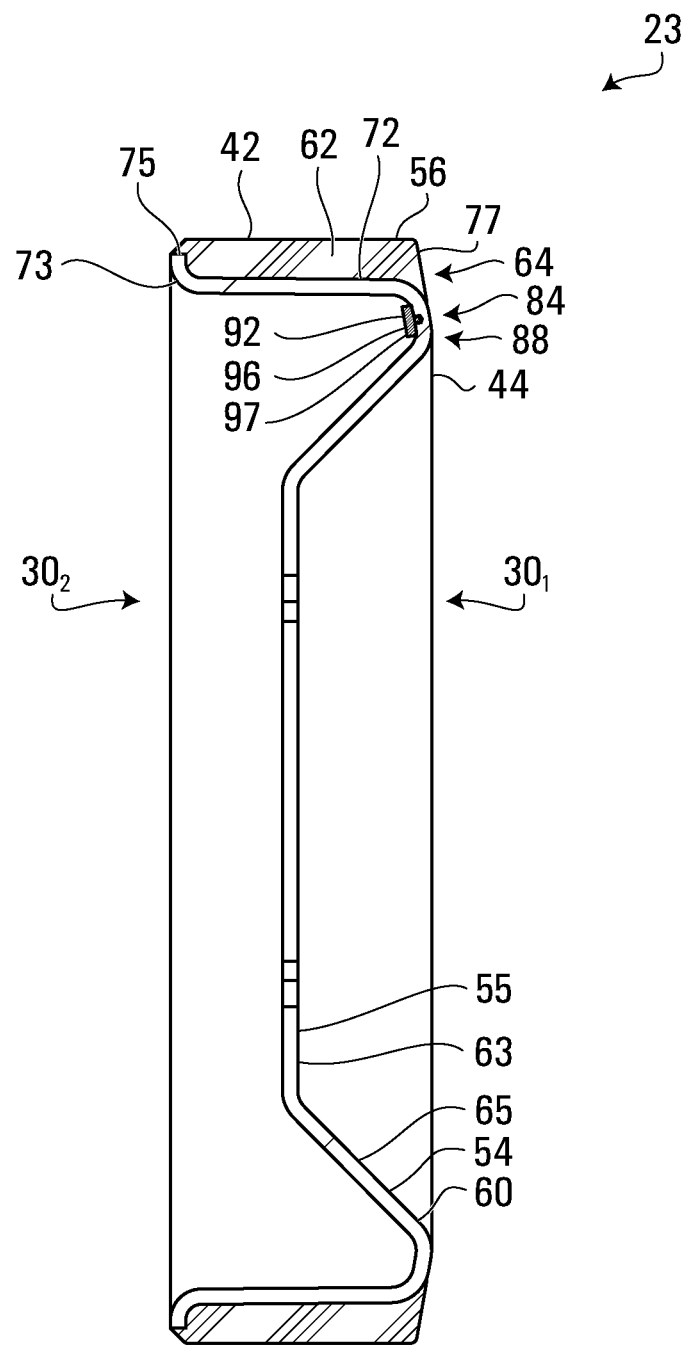
FIGS. 30 to 38 show variants of the idler wheel.
Figure 31:
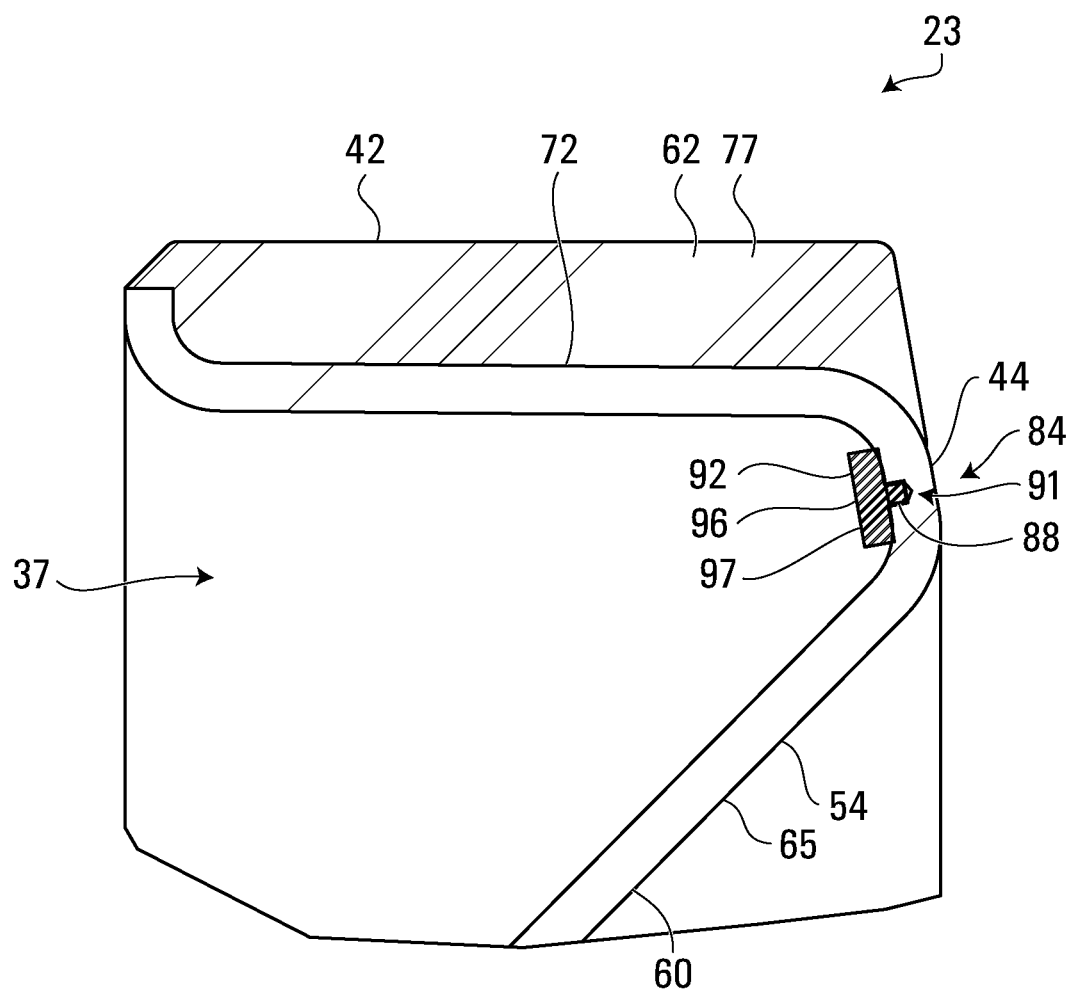

In some embodiments, the communication device 112 may be a smartphone, as shown in FIG. 21.

In addition to being weatherproof, in this embodiment, the monitoring system 82 may determine when the sensors 84 are covered by wet and/or abrasive surrounding elements such as mud. For example, if the output signal of one of the sensors 84 indicate a sudden change in the temperature of the sensor 84 or if the output signals of the sensors 84 indicate that a temperature difference between idler wheels 23, 26 of the same track system 16 is too great, the monitoring system 82 may conclude that surrounding element prevent the sensors 84 from sensing the actual temperature of the idler wheels 23, 26 and generate the signal 90 indicating that the sensors 84 need to be cleaned from the wet and/or abrasive surrounding elements. In some embodiments, also, the monitoring system 82 may continue to sense the temperature of the idler wheels and to assess alignment of the track 22 using the given ones sensors 84 that are not obtruded by wet and/or abrasive surrounding elements.

The vehicle 10, including the track systems 16 and the monitoring system 82, may be configured in various other ways in other embodiments.

For example, although in the embodiments described above each one of the idler wheels 23, 26 comprises on of the sensors 84, in some embodiments, each one of the wheels 23, 26 may comprise more than one of the sensors 84. The sensors 84 present in each idler wheel 23 may sense the same characteristic (e.g., temperature, stress, strain) of the idler wheel 23 or, in other embodiments, may sense different characteristics idler wheel 23.

As another example, although in some embodiments described above the sensors 84 are disposed in or on the idler wheels 23, 26, in some embodiments, the sensors 84 may be disposed in the mid-rollers 28 in a similar fashion as discussed above. That is, in some embodiments, the mid-rollers 28 and the idler wheels 23, 26 may comprise sensors 84, while in some embodiments the mid-rollers 28 may comprise sensors 84 while at least some of (i.e., some of, a majority of or all of) the idler wheels 23, 26 may not comprise any sensor 84.

Figure 32:
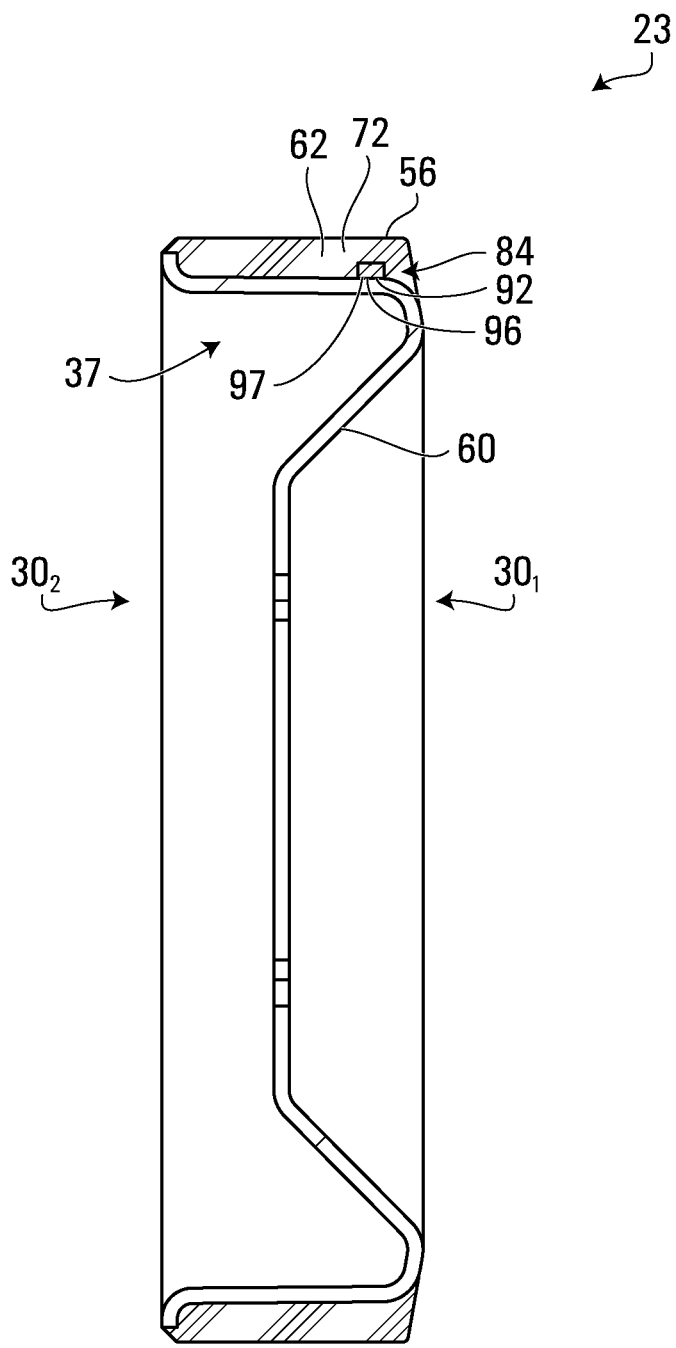
Figure 33:
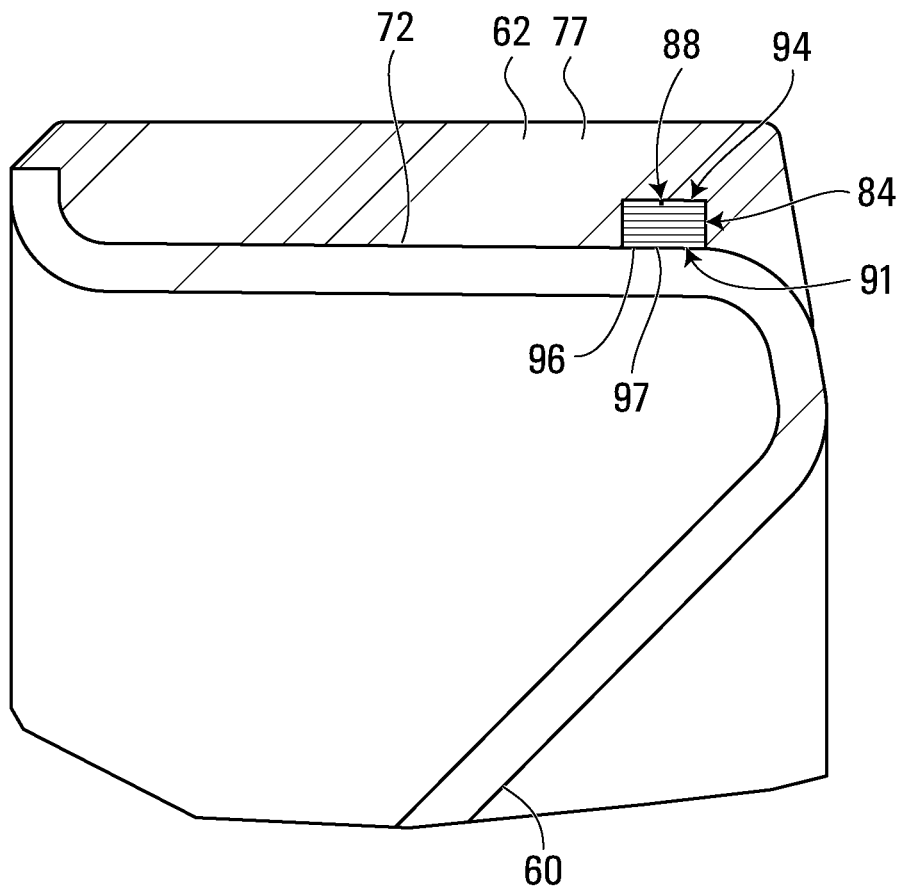
Figure 34:
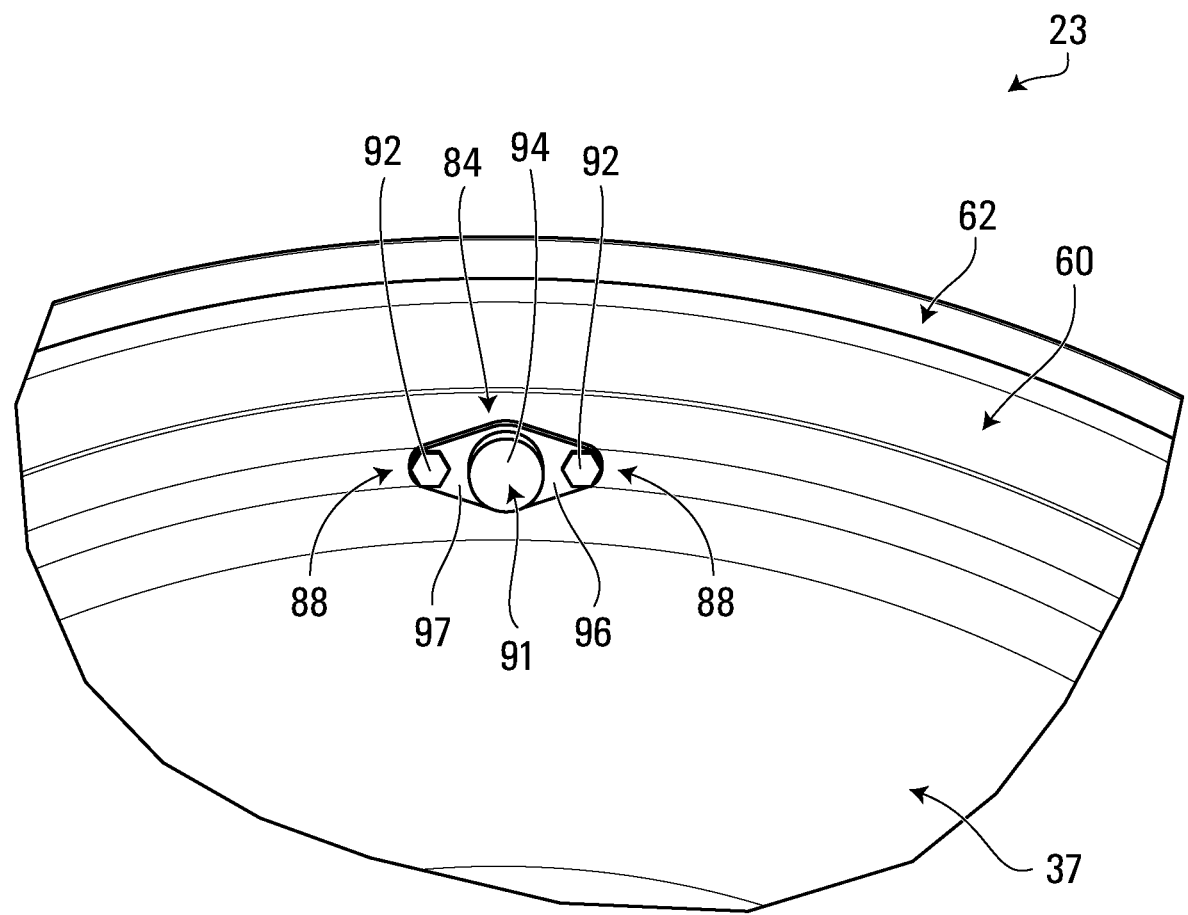
Figure 35:
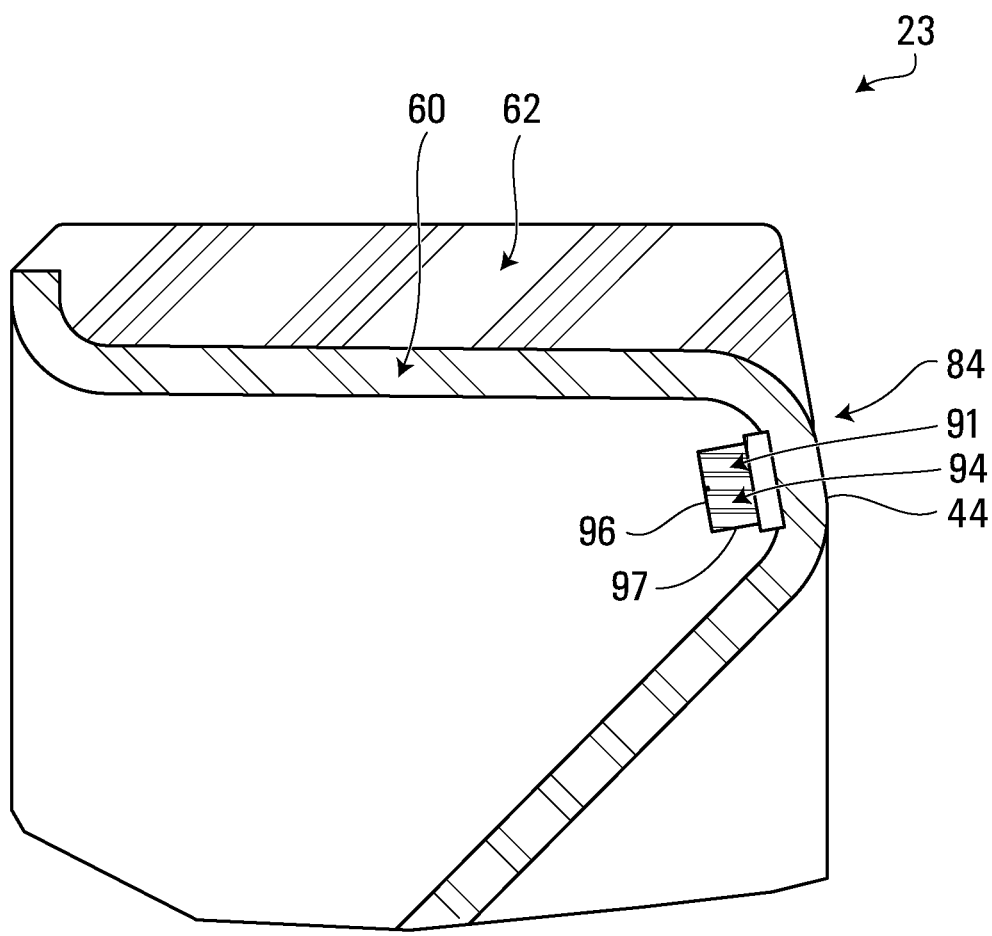
Figure 36:
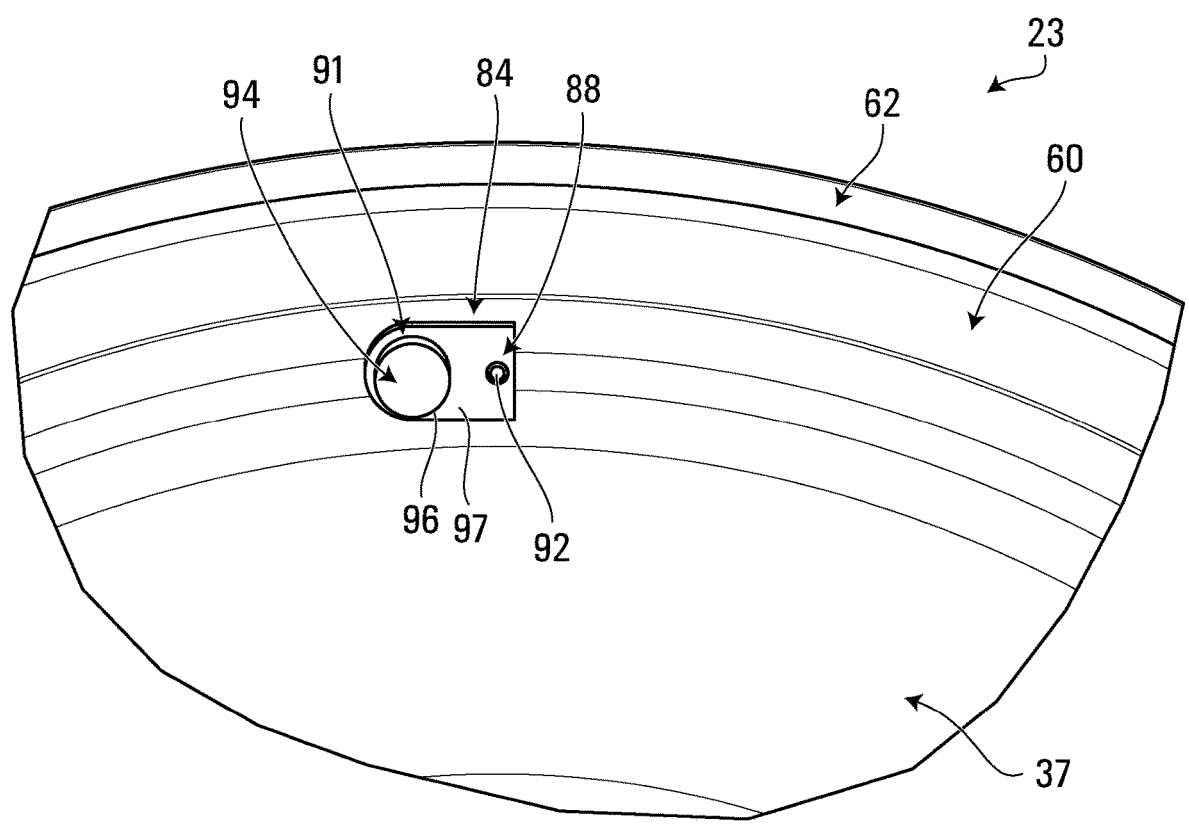
Figure 37:
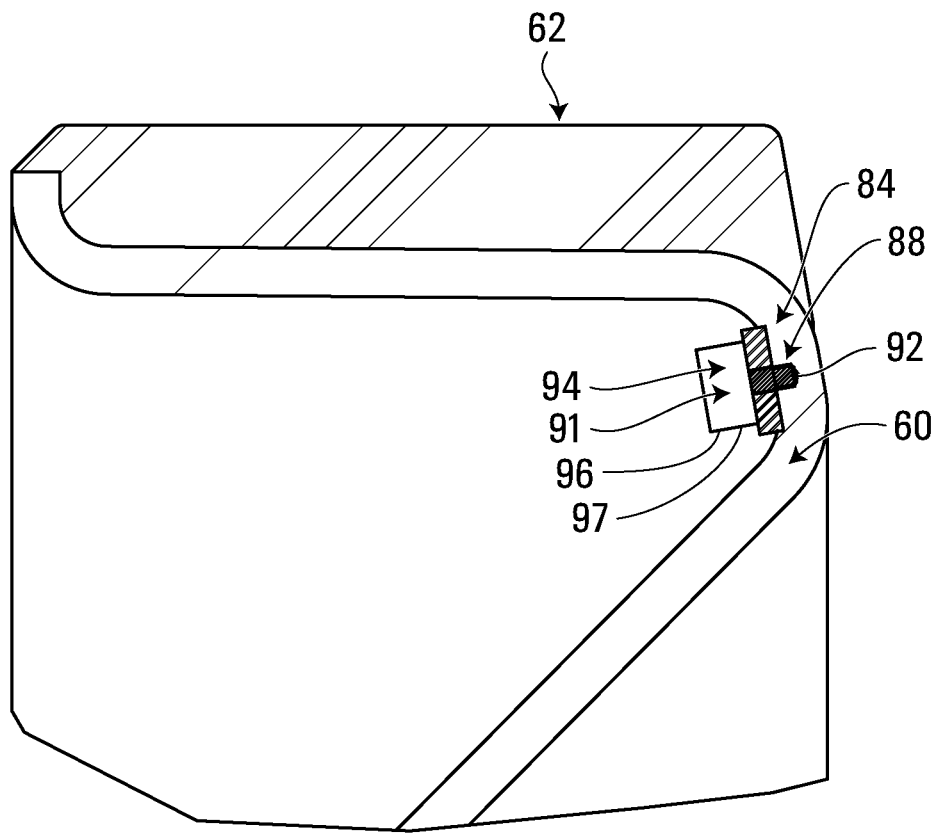

As another example, as shown in FIGS. 32 and 33, rather than being disposed in the rigid body 60, the sensors 84 may be disposed in the covering 62. For example, in some embodiments, the sensors 84 may be disposed on the surface 72 of the rigid body 60 and buried in the elastomeric material 77 of the covering 62, which houses and protects the sensor from harmful surrounding elements. In some embodiments, the sensors 84 may be disposed on the surface 72 of the rigid body 60 and the covering 62 may be molded over the sensors 84. In some embodiment, the opening 88 may be made through the covering 62 (e.g., by being drilled into the material 77 of the covering).

Figure 38:
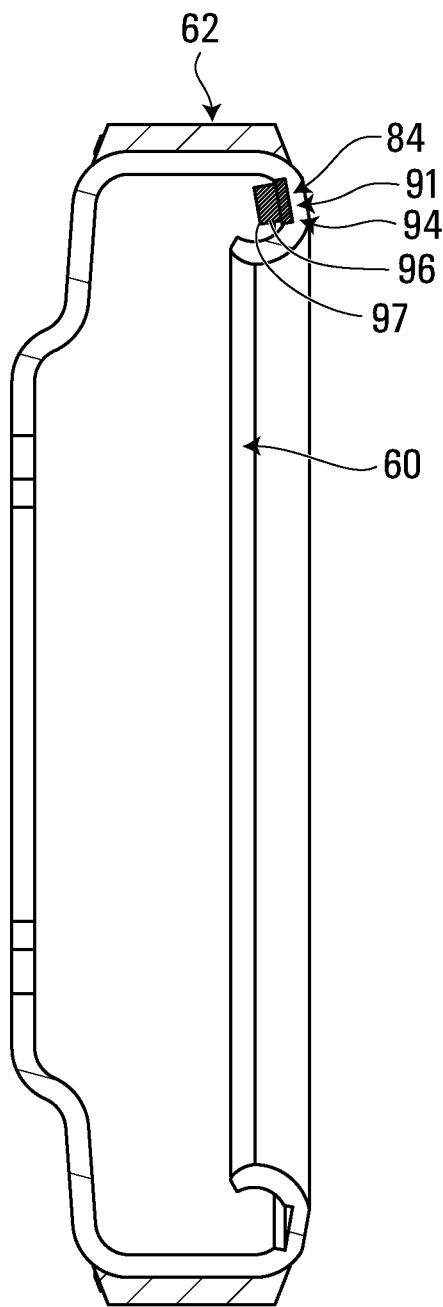

As another example, as shown in FIG. 38, the sensors 84 may be attached to the rigid body 60 fastenerlessly. That is, the sensors 84 may be attached to the rigid body 60 without any fastener. For example, in some embodiments, the hollow space 37 of the rigid body 60 defines a concave volume which allows the sensors 84 to clip in position and retain the sensors 84 into place during use.

Although the agricultural vehicle 10 illustrated in FIG. 1 is an agricultural tractor comprising two drive wheels 17 and two track systems 16, different types of agricultural vehicles configured differently (e.g., having a different number of track systems) may implement improvements based on principles disclosed herein.

Figure 39:
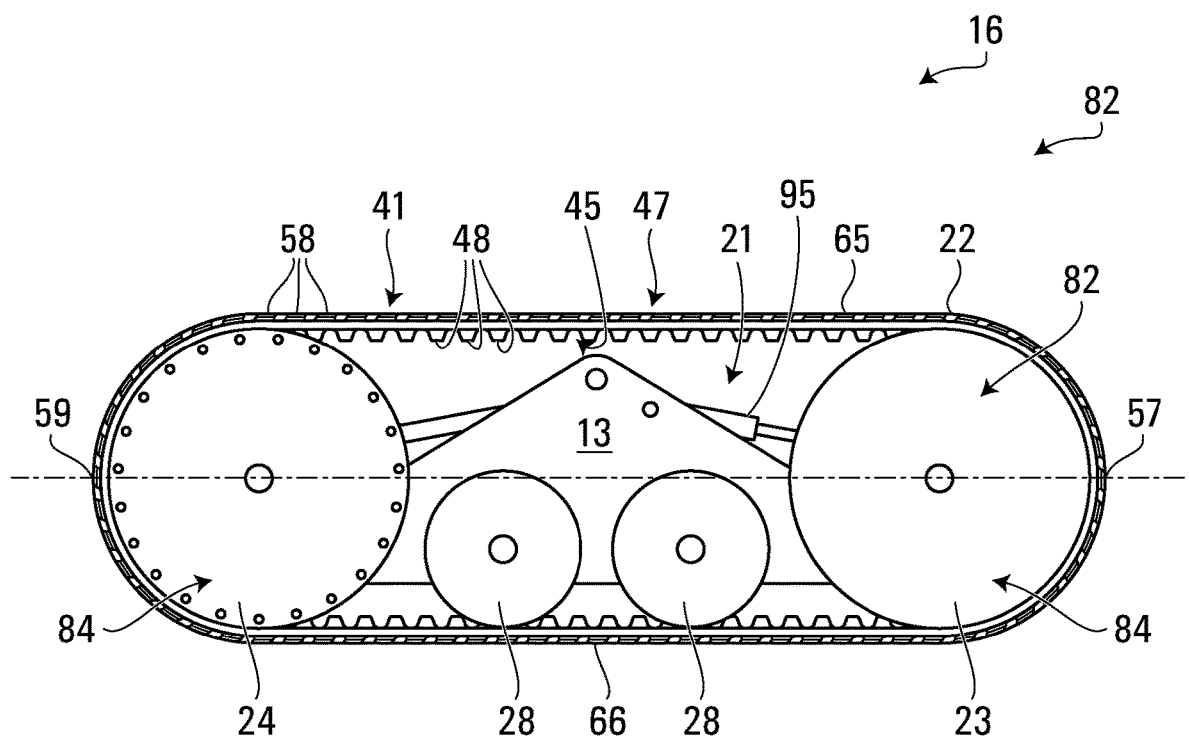
FIGS. 39 to 40E show a variant of a track system comprising a drive wheel.
Figure 40A:
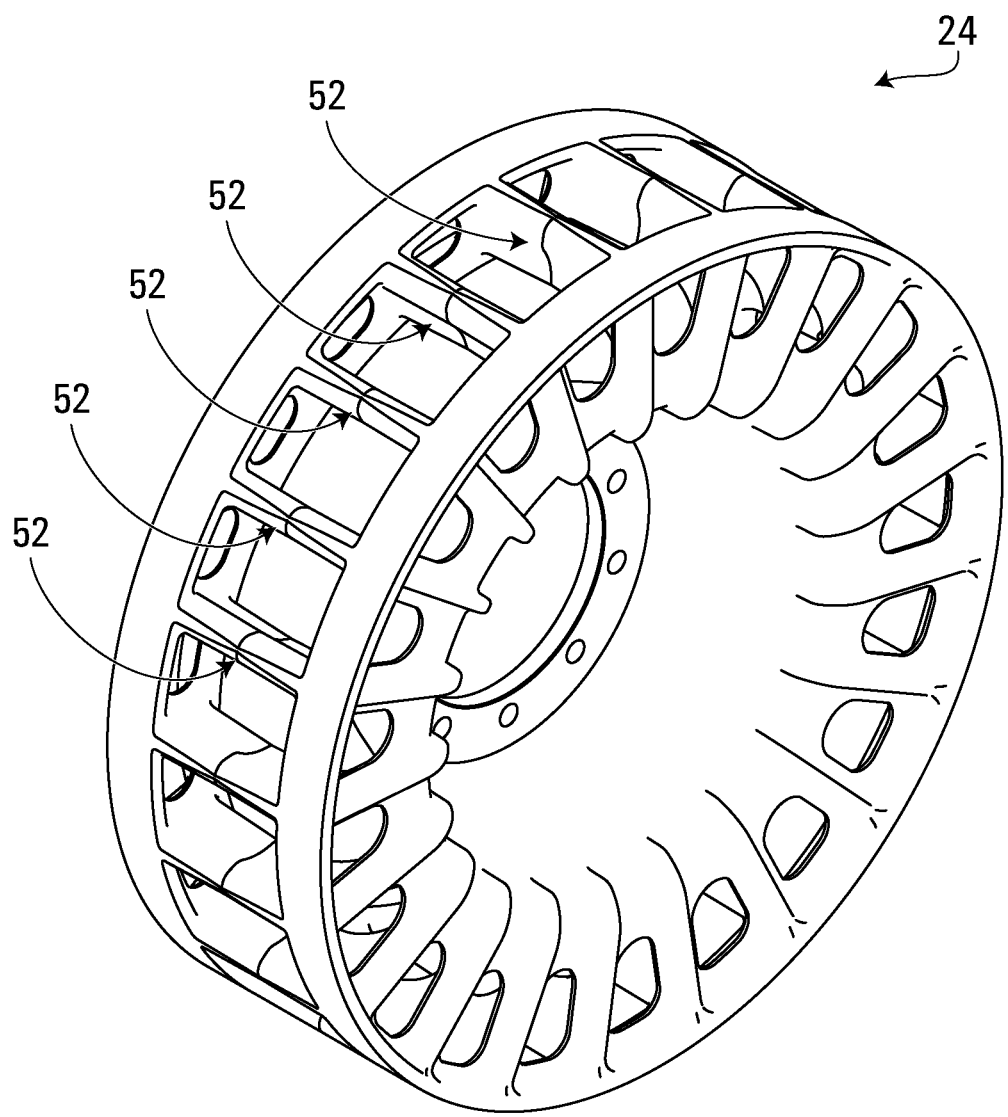
Figure 40B:
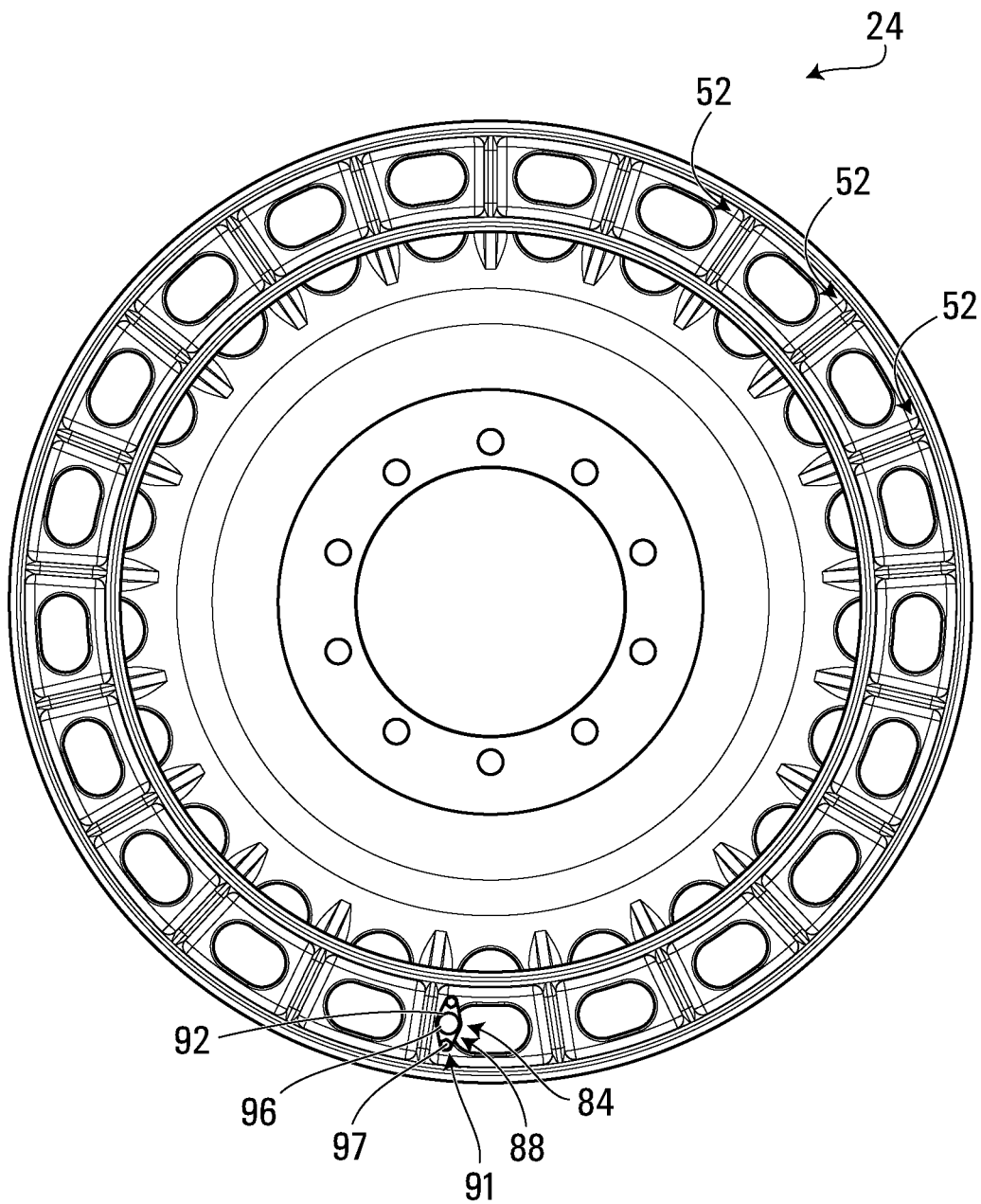
Figure 40C:
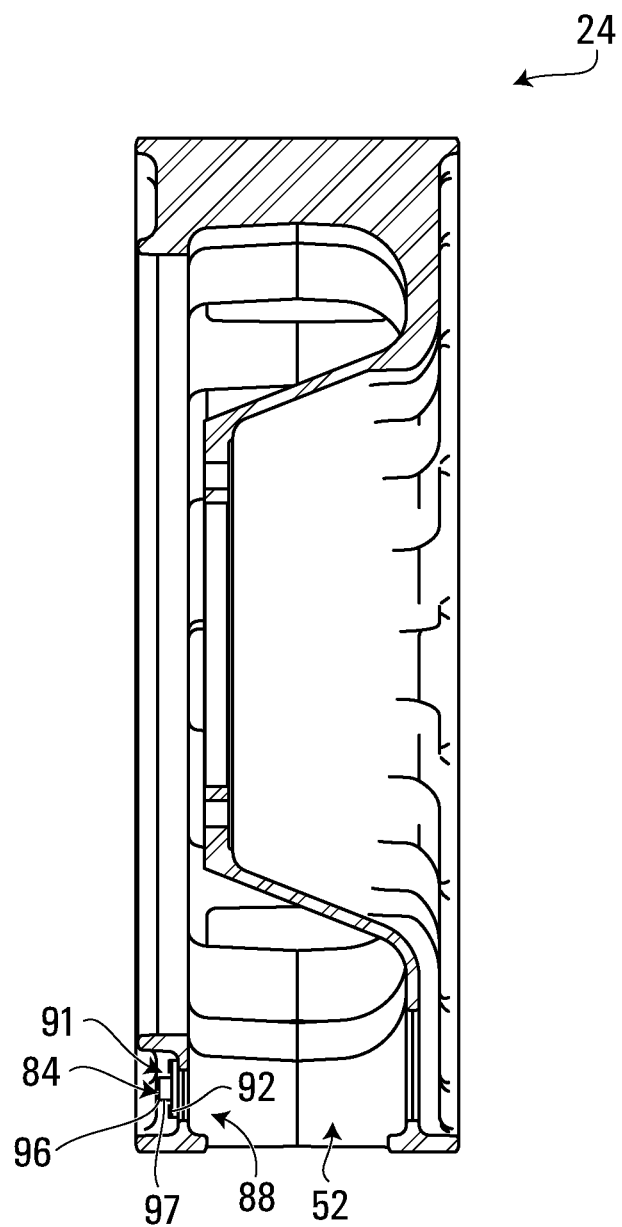
Figure 40D:
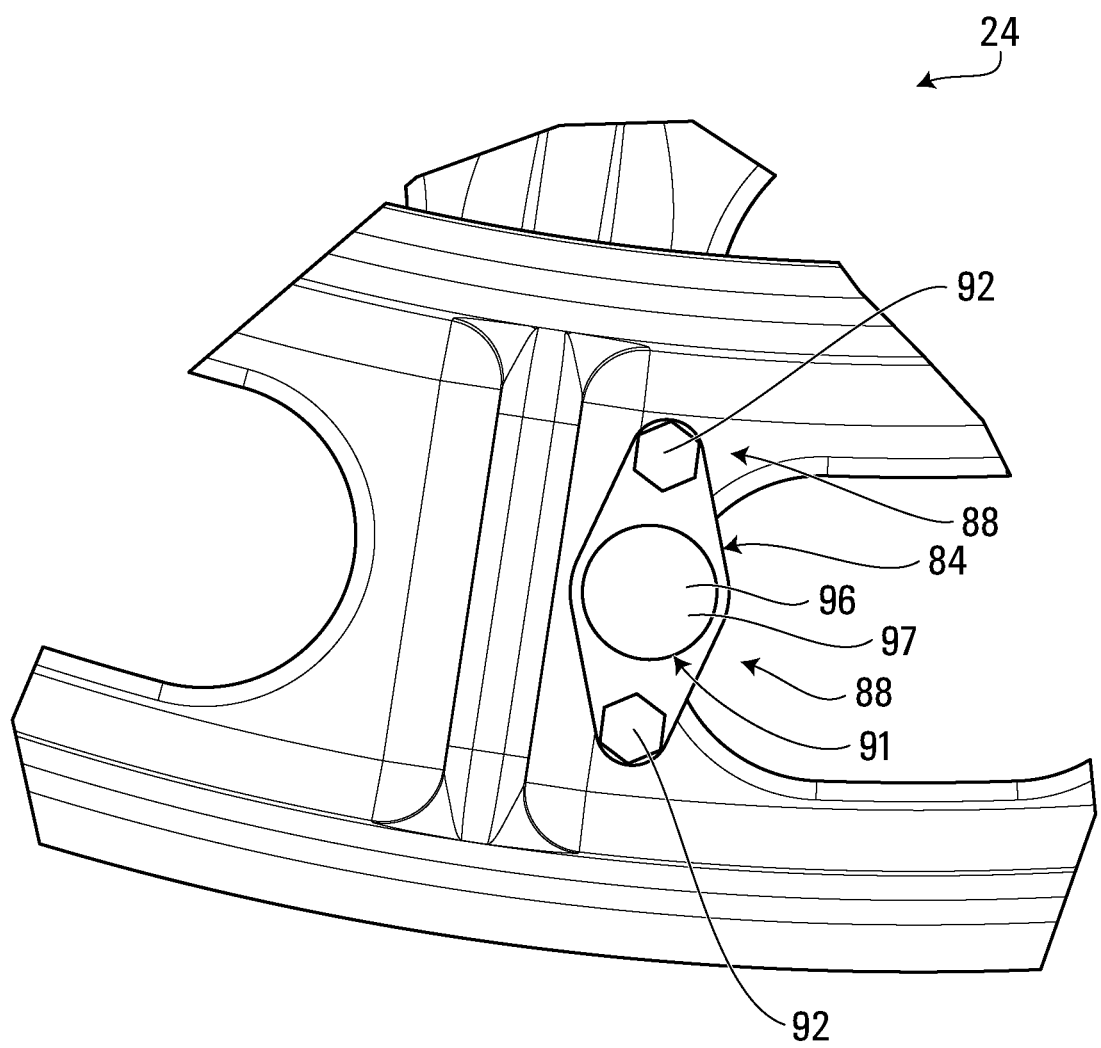
Figure 40E:
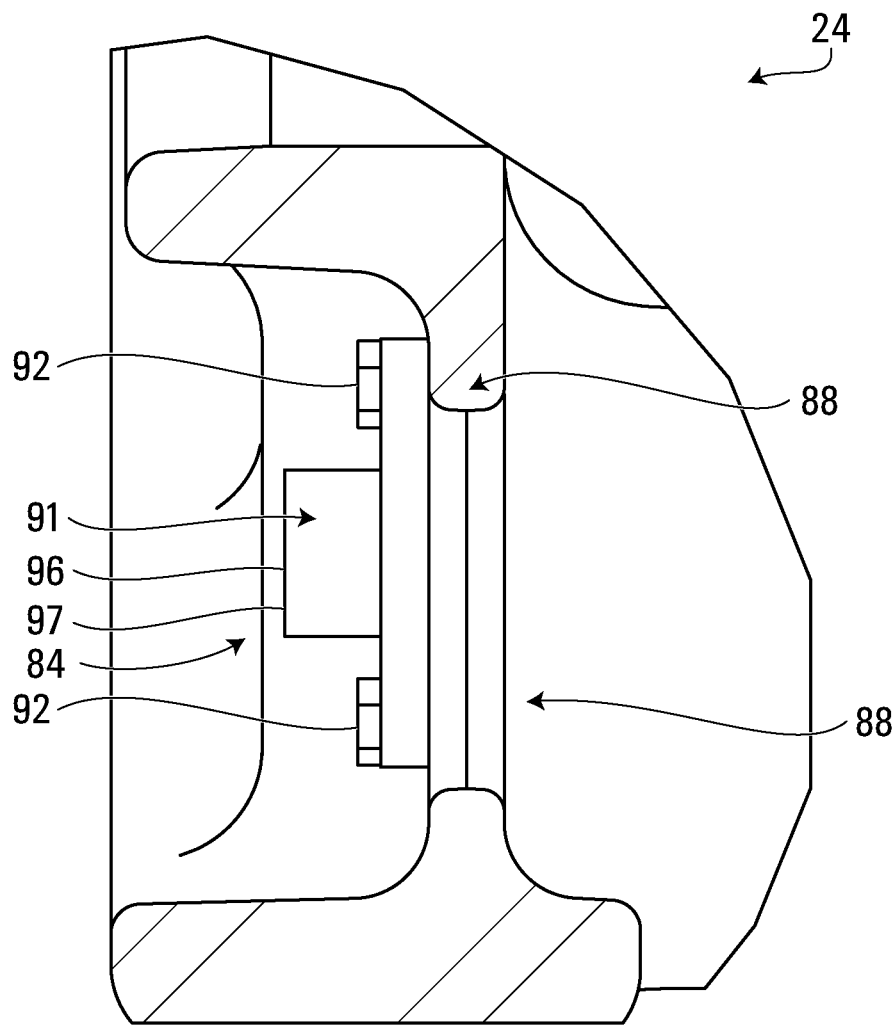

For example, with additional reference to FIG. 39, in some embodiments, the track systems 16 may be motorized. Thus, the track-contacting wheels of each track system 16 may comprise a drive wheel 24. In this example, the powertrain 15 may transmit motive power generated by the prime mover 14 to the track systems 16 in order to drive (i.e., impart motion to) the track systems 16. The powertrain 15 may transmit power from the prime mover 14 to the track systems 16 in any suitable way. In this embodiment, the powertrain 15 comprises a transmission between the prime mover 14 and final drive axles 56 for transmitting motive power from the prime mover 14 to the track systems 16. The transmission may be an automatic transmission (e.g., a continuously variable transmission (CVT)) or any other suitable type of transmission. The drive wheel 24 may be rotatable by power derived from the prime mover 14 to drive the track 22. That is, power generated by the prime mover 14 and delivered over the powertrain 15 of the agricultural vehicle 10 can rotate a final drive axle 56, which causes rotation of the drive wheel 24, which in turn imparts motion to the track 22. In this examples, the lugs 48 may interact with the drive wheel 24, in this case with drive members 52 of the drive wheel 24 that are distributed around a periphery of the drive wheel 24, in order to cause the track 22 to be driven, and may thus be drive lugs in addition to being guide lugs. Alternatively, in other embodiments, the drive wheel 24 may frictionally drive the track 22.

In some embodiments, as shown in FIGS. 40A to 40E, the drive wheel 24 may comprise one or more of the sensors 84 of the monitoring system 82 according to principles discussed above. For example, in some embodiments, a sensor 84 may be disposed between adjacent ones of the drive members 52 of the drive wheel 24.

Figure 41:
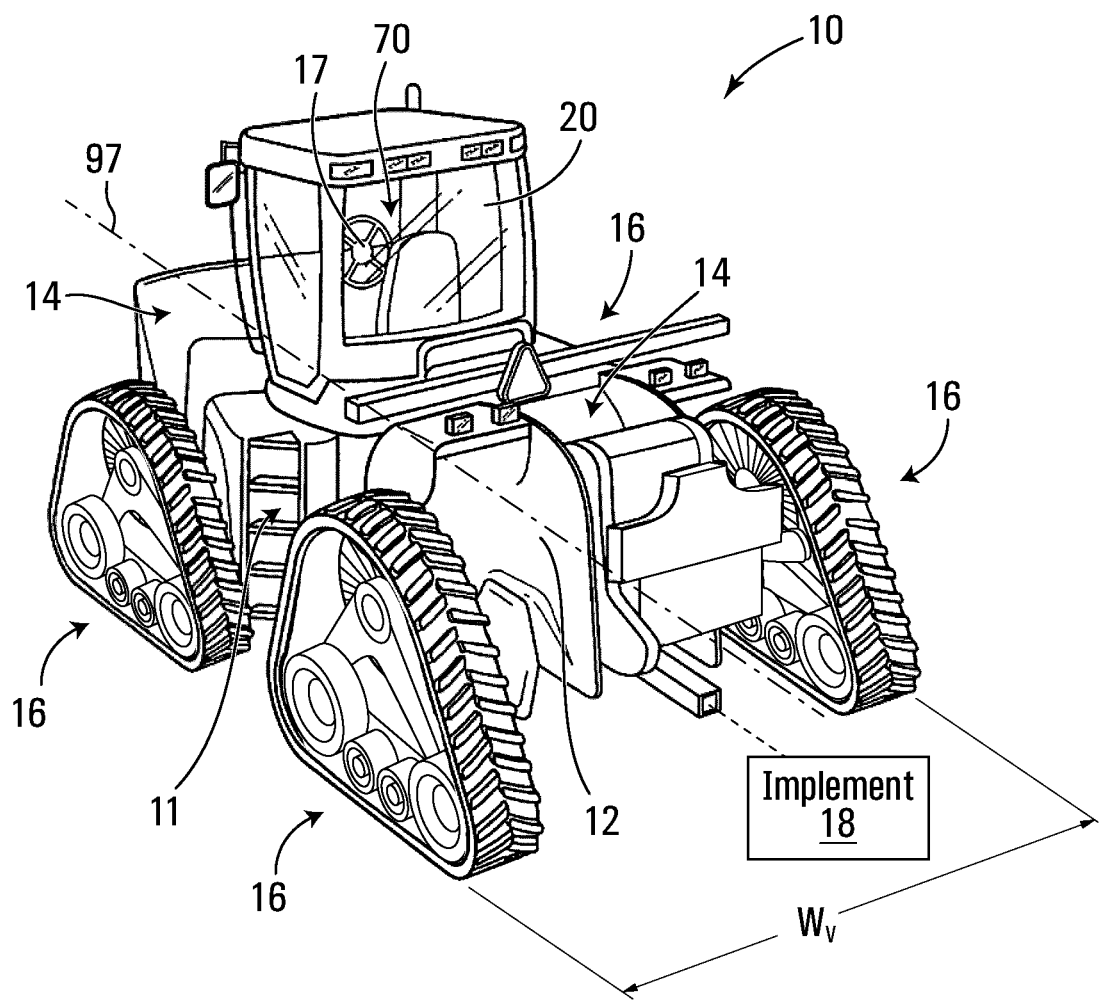
FIGS. 41 and 42 show variants of the tracked vehicle.

As another example, with additional reference to FIG. 41, the agricultural vehicle 10 may be provided comprising four track systems 16 rather than two (i.e., two track system 16 at each side of the agricultural vehicle 10). The agricultural vehicle 10 also comprises the frame 12, the prime mover 14, and the operator cabin 20 and can be equipped with the work implement 18 to perform agricultural work. Each track system 16 comprises the drive wheel 24, the idler wheel 23 at a first longitudinal end portion of the track system 16, the idler wheel 26 at the second longitudinal end portion of the track system 16 opposite to the first longitudinal end portion, and a plurality of mid-rollers 28 intermediate the idler wheels 23, 26. The track system 16 further comprises a track 22 disposed around the wheels 23, 24, 26, 28 and driven by the drive wheel 24. The track system 16 may implement the monitoring system 82 as described above. Additionally or alternatively, the track 22 may be configured in a manner similar to the track 22 as described above.

Figure 42:
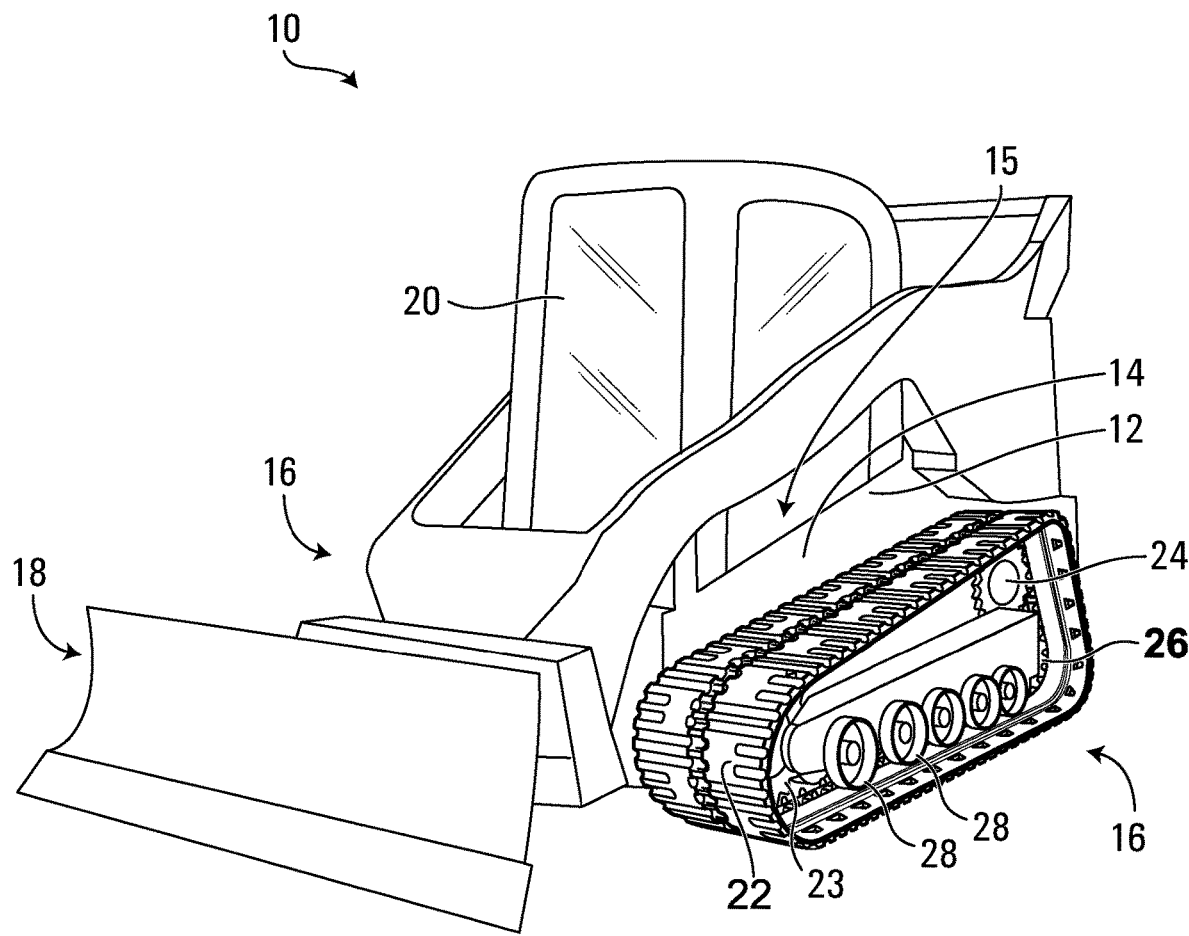

As another example, with additional reference to FIG. 42, the agricultural vehicle 10 may be provided comprising two track systems 16 which entirely support and propel the vehicle 10 (i.e., without the wheels 17). The agricultural vehicle 10 also comprises the frame 12, the prime mover 14, and the operator cabin 20 and can be equipped with the work implement 18 to perform agricultural work. Each track system 16 comprises the drive wheel 24 at the first longitudinal end portion of the track system 16, the idler wheel 26 at the second longitudinal end portion of the track system 16 opposite to the first longitudinal end portion, and the plurality of mid-rollers 28 intermediate the idler wheels 23, 26. The track system 16 further comprises the track 22 disposed around the wheels 23, 24, 26, 28 and driven by the drive wheel 24. The track system 16 may implement the monitoring system 82 as described above. Additionally or alternatively, the track 22 may be configured in a manner similar to the track 22 as described above.

Figure 43:
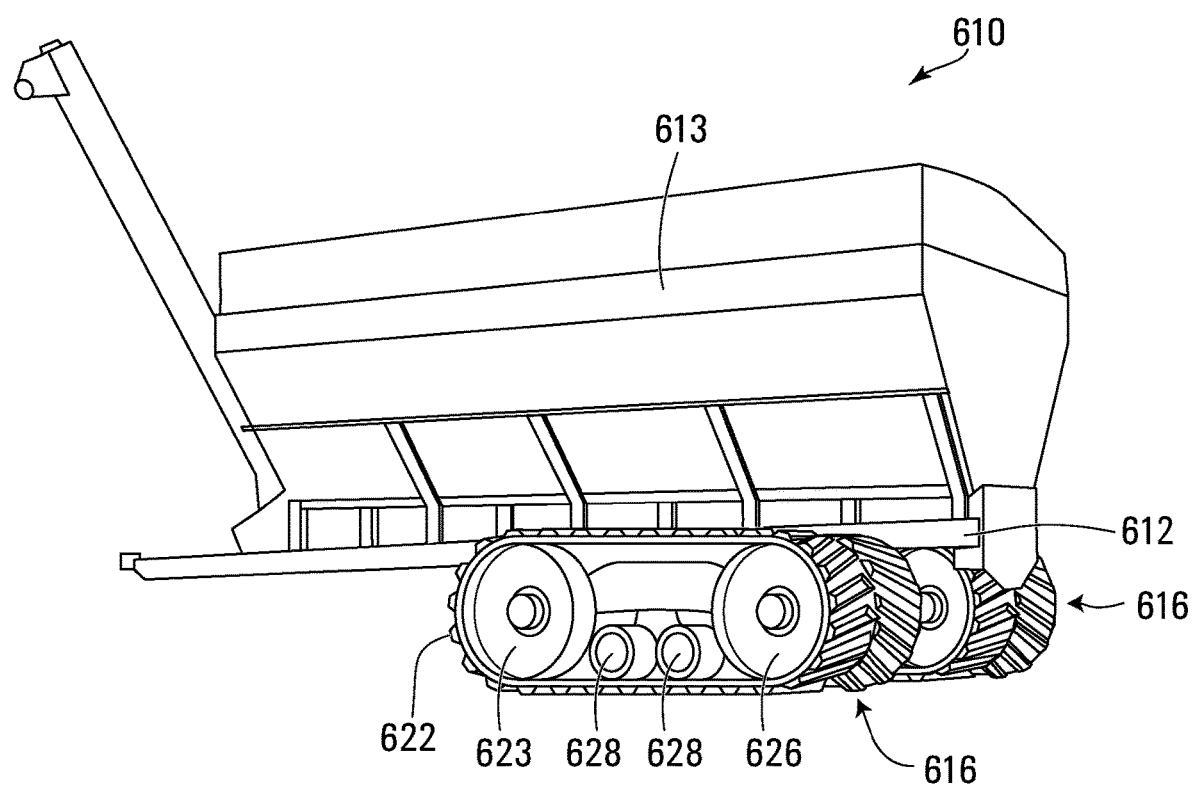
FIG. 43 shows a trailed vehicle configured to be attached to the agricultural vehicle of FIG. 1 or 42.

Furthermore, the work implement 18 that is drawn by the agricultural vehicle 10 or the agricultural vehicle 510 may implement the improvements disclosed herein. For instance, with additional reference to FIG. 43, the work implement 18 may comprise a trailed vehicle 610 comprising a frame 612, a body 613 (e.g., a container) and track systems $616_1$, $616_2$. In this example, the trailed vehicle 610 is a harvest cart. In other examples, the trailed vehicle 610 may be a fertilizer cart, a sprayer, a planter or any other suitable type of trailed vehicle. Each track system $616_i$ of the trailed vehicle 610 comprises front (i.e., leading) idler wheels $623_1$, $623_2$ at a first longitudinal end portion of the track system $616_i$, rear (i.e., trailing) idler wheels $626_1$, $626_2$ at a second longitudinal end portion of the track system $616_i$ opposite the first longitudinal end portion, and a plurality of mid-rollers $628_1$-$628_4$ intermediate the front idler wheels $623_1$, $623_2$ and the rear idler wheels $626_1$, $626_2$. The track system $616_i$ further comprises a track 622 disposed around the wheels $626_1$, $626_2$, $626_1$, $626_2$, $628_1$-$628_4$. The track system $616_i$ may implement the monitoring system 82 as described above. Additionally or alternatively, the track 622 may be configured in a manner similar to the track 22 as described above.

In this example, the trailed vehicle 610 is not motorized in that it does not comprise a prime mover for driving the track systems 616. Rather, the trailed vehicle 610 is displaced by the agricultural vehicle 10 or the agricultural vehicle 510 to which the trailed vehicle 610 is attached. However, in some examples, the trailed vehicle 610 may be motorized. That is, the trailed vehicle 610 may comprise a prime mover for driving a drive wheel of each track system 616. For example, instead of comprising rear idler wheels 626, the track system 616 may comprise a drive wheel for driving the track 622.

Although in embodiments considered above the vehicle 10 is an agricultural vehicle operable by a user from the operator cabin 20, in some embodiments, the vehicle 10 may be operable by a user remotely. In some embodiments, the vehicle 10 may comprise autonomy features, allowing the vehicle 10 to be semi-autonomous and/or entirely autonomous. In some embodiments, the vehicle 10 may be free of any operator cabin.

While in embodiments considered above the vehicle 10 is an agricultural vehicle, in other embodiments, the vehicle 10 may be an industrial vehicle such as a construction vehicle (e.g., a loader, a telehandler, a bulldozer, an excavator, etc.) for performing construction work or a forestry vehicle (e.g., a feller-buncher, a tree chipper, a knuckleboom loader, etc.) for performing forestry work, a military vehicle (e.g., a combat engineering vehicle (CEV), etc.) for performing military work, an all-terrain vehicle (ATV), a snowmobile, or any other vehicle operable off paved roads. Although operable off paved roads, the vehicle 10 may also be operable on paved roads in some cases.

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A monitoring system for a vehicle comprising a track system having a track-engaging assembly with a frame, and a track for traction of the vehicle on a ground, the track comprising a ground-engaging outer surface and an inner surface opposite to the ground-engaging outer surface and being mounted around the frame of the track-engaging assembly configured to move the track around the track-engaging assembly, the track-engaging assembly comprising a plurality of wheels for engaging the track comprising front idler wheels, rear idler wheels, and a plurality of roller wheels dispersed between the front idler wheels and the rear idler wheels, the track being elastomeric to flex around the track-engaging assembly, the monitoring system comprising:

a sensor configured to sense a characteristic of a given one of the plurality of wheels;

a processing apparatus configured to generate a signal relating to an alignment of the track based on the characteristic of the given one of the plurality of wheels; and an alignment mechanism configured to receive the signal relating to the alignment of the track and adjust a position of the plurality of wheels relative to the track based on the signal relating to the alignment of the track;

wherein the alignment mechanism comprises:

an adjusting element extending through a hub of a given one of the front idler wheels and the rear idler wheels and adjustably coupled to the frame; and an actuator acting on the adjusting element to adjust a position of the hub of the given one of the front idler wheels and the rear idler wheels relative to the frame to thereby adjust the position of the plurality of wheels relative to the track.

2. The monitoring system of claim 1, wherein: the given one of the plurality of wheels is a first one of the wheels; the sensor is a first sensor; the monitoring system comprises a second sensor configured to sense a characteristic of a second one of the plurality of wheels; and the processing apparatus is configured to generate the signal relating to the alignment of the track based on the characteristic of the first one of the plurality of wheels and the characteristic of the second one of the plurality of wheels, and wherein the first one of the plurality of wheels and the second one of the plurality of wheels are spaced apart in a widthwise direction of the track system.

3. The monitoring system of claim 1, wherein the signal relating to the alignment of the track is directed to a communication device for conveying information to a user of the communication device, and wherein the communication device comprises a display for displaying the information to the user or the communication device is part of a user interface of an operator cabin of the vehicle.

4. The monitoring system of claim 1, wherein the processing apparatus is configured to assess the alignment of the track based on the characteristic of the given one of the plurality of wheels.

5. The monitoring system of claim 4, wherein the processing apparatus is configured to assess the alignment of the track based on a comparison of the characteristic of the given one of the plurality of wheels to reference data.

6. The monitoring system of claim 5, wherein the processing apparatus is configured to generate the signal relating to the alignment of the track when the characteristic of the given one of the plurality of wheels at least reaches a reference value.

7. The monitoring system of claim 1, wherein the adjusting element is at least one screw extending through the hub.

8. The monitoring system of claim 1, wherein the signal relating to the alignment of the track is directed to the actuator and/or wherein the signal relating to the alignment of the track is indicative of a magnitude of the adjustment to be made.

9. The monitoring system of claim 8, wherein the signal relating to the alignment of the track that is indicative of the magnitude of the adjustment to be made is directed to the actuator to adjust the alignment of the track to a specific degree of adjustment, and wherein the specific degree of adjustment is at least one of: a distance between the track-engaging assembly and the track, a number of turns of the adjusting element, and a fraction of turns of the adjusting element.

10. The monitoring system of claim 1, wherein at least one of:
the front idler wheels comprises a first front idler wheel on a first side of the frame and a second front idler wheel on a second side of the frame, the first front idler wheel and the second front idler wheel being separated by the hub and the frame; wherein the adjusting mechanism comprises a first front adjusting mechanism coupled through the hub adjacent to the first front idler wheel and a second front adjusting mechanism coupled through the hub adjacent to the second front idler wheel; and
the rear idler wheels comprises a first rear idler wheel on the first side of the frame and a second rear idler wheel on the second side of the frame, the first rear idler wheel and the second rear idler wheel being separated by the hub and the frame; wherein the adjusting mechanism comprises a first rear adjusting mechanism coupled through the hub adjacent to the first rear idler wheel and a second rear adjusting mechanism coupled through the hub adjacent to the second rear idler wheel.

11. A method for monitoring a vehicle comprising a track system, the method comprising:
providing the track system comprising a track, a track-engaging assembly having a frame, and an alignment mechanism, the track comprising a ground-engaging outer surface and an inner surface opposite to the ground-engaging outer surface, the track being mounted around the track-engaging assembly configured to move the track around the track-engaging assembly, the track-engaging assembly comprising a plurality of wheels for engaging the track comprising front idler wheels, rear idler wheels, and a plurality of roller wheels, the track being elastomeric to flex around the track-engaging assembly, and the alignment mechanism being configured to adjust a position of the plurality of wheels relative to the track;
using a sensor to sense a characteristic of a given one of the plurality of wheels;
generating a signal relating to an alignment of the track based on the characteristic of the given one of the plurality of wheels; and
adjusting the position of the plurality of wheels relative to the track based on the signal relating to the alignment of the track with the alignment mechanism;
wherein the alignment mechanism comprises an adjusting element extending through a hub of a given one of the front idler wheels and the rear idler wheels and adjustably coupled to the frame; and an actuator acting on the adjusting element; and
wherein adjusting the position of the plurality of wheels relative to the track comprises adjusting a position of the hub of the given one of the front idler wheels and the rear idler wheels relative to the frame.

12. The method of claim 11, wherein adjusting the position of the hub of the given one of the front idler wheels and the rear idler wheels relative to the frame comprises the actuator moving the adjusting element or causing the adjusting element to move.

13. The method of claim 12, wherein the adjusting element is at least one screw extending through the hub.

14. The method of claim 12, wherein the signal relating to the alignment of the track is indicative of a magnitude of the adjustment to be made.

15. The method of claim 14, wherein the signal relating to the alignment of the track that is indicative of the magnitude of the adjustment to be made is directed to the actuator to move the alignment element to a specific degree of adjustment.

16. The method of claim 15, wherein the specific degree of adjustment is at least one of: a distance between the track-engaging assembly and the track, a number of turns of the adjusting element, and a fraction of turns of the adjusting element.

17. The method of claim 11, wherein at least one of:
the signal relating to the alignment of the track is configured to be directed to a powertrain of the vehicle to control the powertrain of the vehicle, wherein the method further comprises transmitting the signal relating to the alignment of the track to the powertrain of the vehicle to control a speed of the vehicle; and
the vehicle comprises a tensioner configured to control a tension of the track, wherein the method further comprises transmitting the signal relating to the alignment of the track to the tensioner to control the tensioner.

18. The method of claim 11, wherein the signal relating to the alignment of the track relates to a speed of the vehicle, a reduction of the speed of the vehicle, or a limit on the speed of the vehicle.

19. A track system for traction of a vehicle, the track system comprising:
a track comprising a ground-engaging outer surface and an inner surface opposite to the ground-engaging outer surface;
a track-engaging assembly configured to move the track around the track-engaging assembly, the track being elastomeric to flex around the track-engaging assembly, the track-engaging assembly comprising a frame and a plurality of wheels for engaging the track comprising front idler wheels, rear idler wheels, and a plurality of roller wheels coupled to the frame; and
a monitoring system comprising:
a sensor configured to sense a characteristic of a given one of the plurality of wheels;
a processing apparatus configured to generate a signal relating to an alignment of the track based on the characteristic of the given one of the plurality of wheels; and
an alignment mechanism configured to receive the signal relating to the alignment of the track and adjust a position of the plurality of wheels relative to the track based on the signal relating to the alignment of the track;
wherein the alignment mechanism comprises:
an adjusting element extending through a hub of a given one of the front idler wheels and the rear idler wheels and adjustably coupled to the frame; and
an actuator acting on the adjusting element to adjust a position of the hub of the given one of the front idler wheels and the rear idler wheels relative to the frame to thereby adjust the position of the plurality of wheels relative to the track.

20. The track system of claim 19, wherein at least one of:
the front idler wheels comprises a first front idler wheel on a first side of the frame and a second front idler wheel on a second side of the frame, the first front idler wheel and the second front idler wheel being separated by the hub and the frame; wherein the adjusting mechanism comprises a first front adjusting mechanism coupled through the hub adjacent to the first front idler wheel and a second front adjusting mechanism coupled through the hub adjacent to the second front idler wheel, the first front adjusting mechanism and the second front adjusting mechanism comprising at least one screw extending through the hub; and the rear idler wheels comprises a first rear idler wheel on the first side of the frame and a second rear idler wheel on the second side of the frame, the first rear idler wheel and the second rear idler wheel being separated by the hub and the frame; wherein the adjusting mechanism comprises a first rear adjusting mechanism coupled through the hub adjacent to the first rear idler wheel and a second rear adjusting mechanism coupled through the hub adjacent to the second rear idler wheel, the first rear adjusting mechanism and the second rear adjusting mechanism each comprising at least one screw extending through the hub.

* * * * *